US012605936B2

(12) United States Patent
Iizawa

(10) Patent No.: US 12,605,936 B2
(45) Date of Patent: Apr. 21, 2026

(54) LIQUID EJECTING DEVICE

(71) Applicant: SEIKO EPSON CORPORATION, Tokyo (JP)

(72) Inventor: Keigo Iizawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 135 days.

(21) Appl. No.: 18/433,568

(22) Filed: Feb. 6, 2024

(65) Prior Publication Data

US 2024/0269981 A1 Aug. 15, 2024

(30) Foreign Application Priority Data

Feb. 10, 2023 (JP) ................................ 2023-019041
Feb. 22, 2023 (JP) ................................ 2023-025879

(51) Int. Cl.
*B41J 2/165* (2006.01)
*B41J 2/155* (2006.01)

(52) U.S. Cl.
CPC ........... *B41J 2/16508* (2013.01); *B41J 2/155* (2013.01); *B41J 2/16588* (2013.01); *B41J 2002/16582* (2013.01); *B41P 2235/20* (2013.01)

(58) Field of Classification Search
CPC .... B41J 2/16508; B41J 2/155; B41J 2/16588; B41J 2002/16582; B41J 2/16538; B41J 2/16541; B41J 2/16544; B41J 2/16585; B41J 25/304; B41P 2235/20
See application file for complete search history.

(56) References Cited

U.S. PATENT DOCUMENTS

| | | | | |
|---|---|---|---|---|
| 9,878,544 | B2 * | 1/2018 | Kerpe | B41J 2/16526 |
| 2016/0263897 | A1 | 9/2016 | Kobashi et al. | |
| 2021/0170753 | A1 * | 6/2021 | Ficarra | B41J 2/16538 |
| 2021/0283914 | A1 * | 9/2021 | Yanase | B41J 2/16511 |

FOREIGN PATENT DOCUMENTS

| | | | |
|---|---|---|---|
| JP | 2000141672 | A | 5/2000 |
| JP | 2007216496 | A | 8/2007 |
| JP | 2011000841 | A | 1/2011 |
| JP | 2011079185 | A | 4/2011 |
| JP | 2016168762 | B | 2/2019 |

* cited by examiner

*Primary Examiner* — Ricardo I Magallanes
*Assistant Examiner* — Tracey M McMillion
(74) *Attorney, Agent, or Firm* — CHIP LAW GROUP

(57) ABSTRACT

A liquid ejecting device includes an ejecting unit including a nozzle surface where a nozzle opens, a cap unit that performs capping, a wiper unit that performs wiping, and a cleaning unit that is attached to the ejecting unit, and performs cleaning on the wiper unit, wherein the wiper unit includes a wiping section that moves in one direction, the wiping section includes a wiper that comes into contact with the nozzle surface, the cleaning unit includes a cleaner that performs the cleaning on the wiper, the cap unit comes into contact with the ejecting unit by the ejecting unit approaching the cap unit in a perpendicular direction of the nozzle surface, a position of the cleaner in the perpendicular direction overlaps a position of the wiper in the perpendicular direction during the capping, and does not overlap the position of the wiper in the perpendicular direction during the wiping.

9 Claims, 25 Drawing Sheets

LIQUID EJECTING DEVICE

The present application is based on, and claims priority from JP Application Serial Number 2023-025879, filed Feb. 22, 2023, and 2023-019041, filed Feb. 10, 2023, the disclosures of which are hereby incorporated by reference herein in its entirety.

BACKGROUND

1. Technical Field

The present disclosure relates to a liquid ejecting device.

2. Related Art

JP 2007-216496 A describes a liquid ejecting device including an ejecting unit including a nozzle surface at which a nozzle for ejecting liquid opens, a cap for capping the ejecting unit, a wiper for wiping the ejecting unit, and a cleaner for cleaning the wiper. The cleaner is attached to the ejecting unit, and cleans the wiper by coming into contact with the wiper.

In the liquid ejecting device described in JP 2007-216496 A, the cleaner is positioned so as to be continuous with the nozzle surface. Therefore, in a state in which the wiper faces the cleaner, when a head approaches the cap, the wiper may interfere with the cleaner. That is, there is a possibility that in a state in which the wiper faces the cleaner, the wiper interferes with the cleaner, and thus the cap cannot cap the ejecting unit. In this case, since it is necessary to retract the wiper from the cleaner for capping, there is a possibility that a size of the liquid ejecting device increases.

SUMMARY

A liquid ejecting device for solving the above-described problems includes an ejecting unit including a nozzle surface at which a nozzle for ejecting liquid opens, a cap unit configured to perform capping to form a space communicating with the nozzle by coming into contact with the ejecting unit, a wiper unit configured to perform wiping to wipe the nozzle surface, and a cleaning unit attached to the ejecting unit, and configured to perform cleaning on the wiper unit, wherein the wiper unit includes a wiping section that moves in one direction, the wiping section includes a wiper that comes into contact with the nozzle surface, the cleaning unit includes a cleaner that performs the cleaning on the wiper, the cap unit comes into contact with the ejecting unit by the ejecting unit approaching the cap unit in a perpendicular direction of the nozzle surface, a position of the cleaner in the perpendicular direction overlaps a position of the wiper in the perpendicular direction during the capping, and does not overlap the position of the wiper in the perpendicular direction during the wiping.

DESCRIPTION OF EMBODIMENTS

An example of a liquid ejecting device will be described below with reference to the drawings. The liquid ejecting device is, for example, an ink jet-type printer that performs printing of an image such as characters and photographs on a medium such as a sheet and fabric by ejecting ink, which is an example of liquid.

Liquid Ejecting Device

Figure 1:
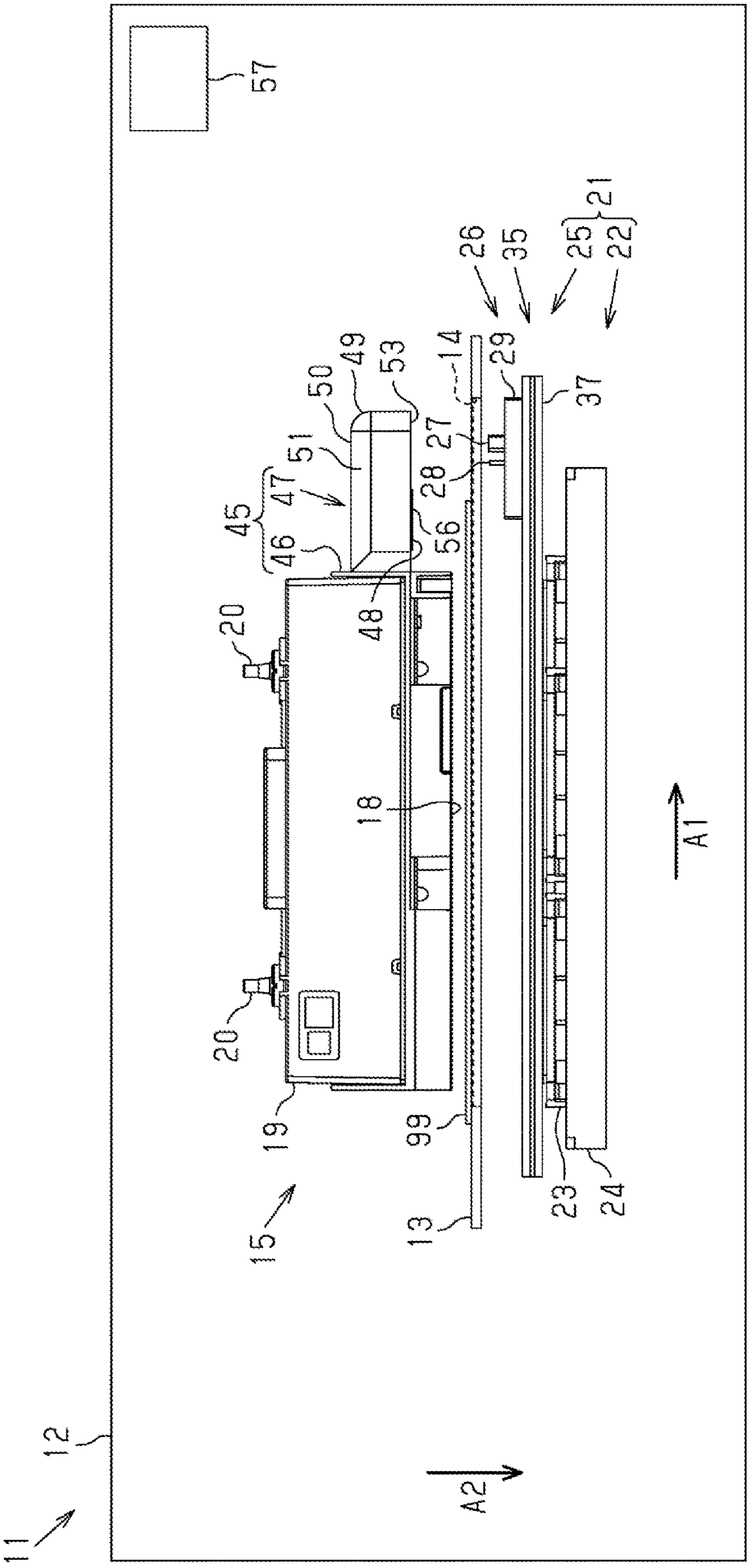
FIG. 1 is a front view illustrating an example of a liquid ejecting device.

As illustrated in FIG. 1, a liquid ejecting device 11 includes a housing 12.

The liquid ejecting device 11 includes a support portion 13. The support portion 13 supports a medium 99. The support portion 13 is, for example, a rectangular or rectangle-shaped plate member. The support portion 13 may be a transport belt that transports the medium 99. In one example, one or more openings 14 are formed at the support portion 13. The opening 14 is positioned so as to correspond to an ejecting unit 15 to be described later. The ejecting unit 15 comes into contact with a maintenance unit 21 to be described later through the opening 14.

Figure 2:
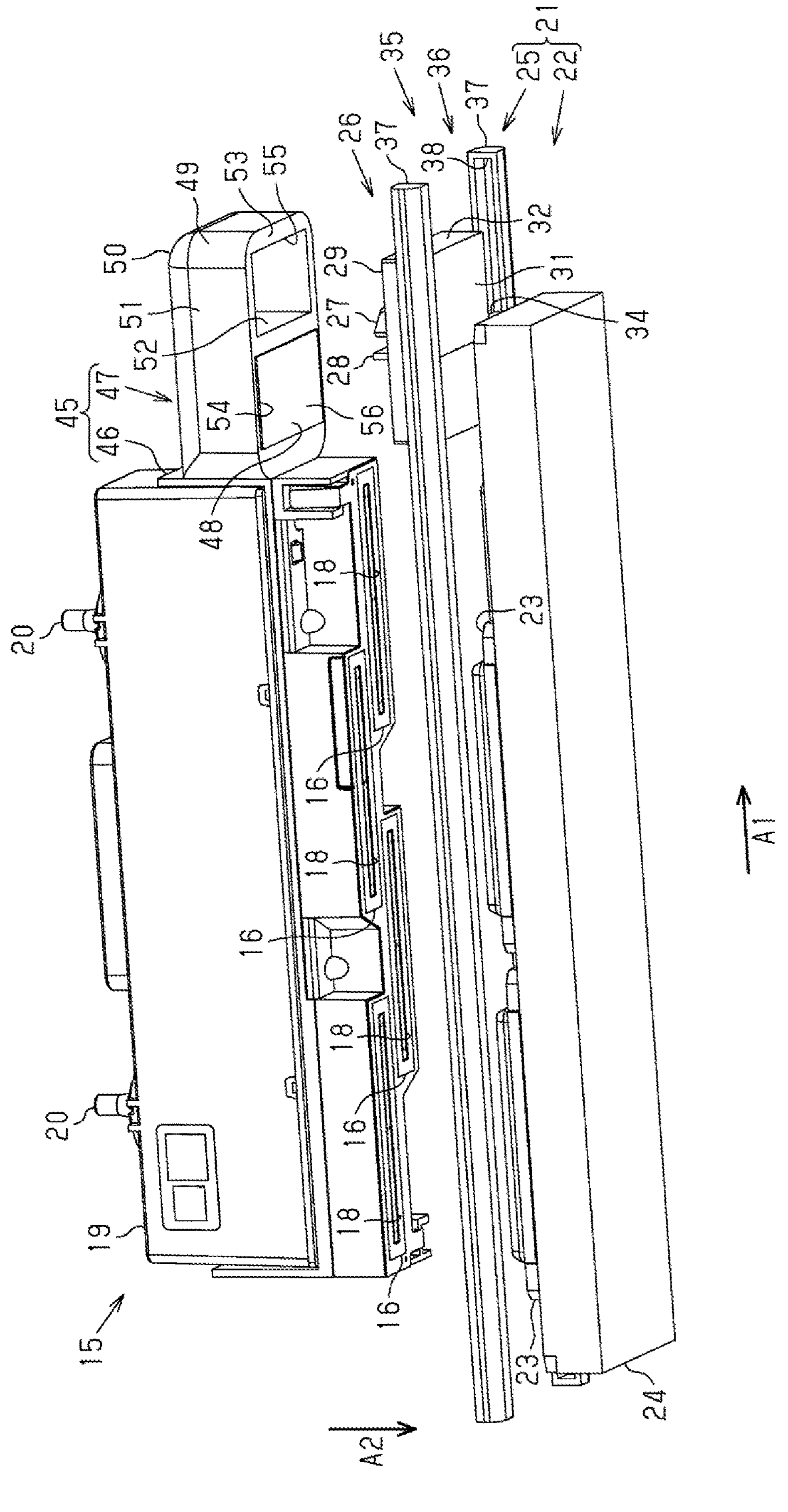
FIG. 2 is a perspective view of an ejecting unit, a wiper unit, a cap unit, and a cleaning unit.
Figure 3:
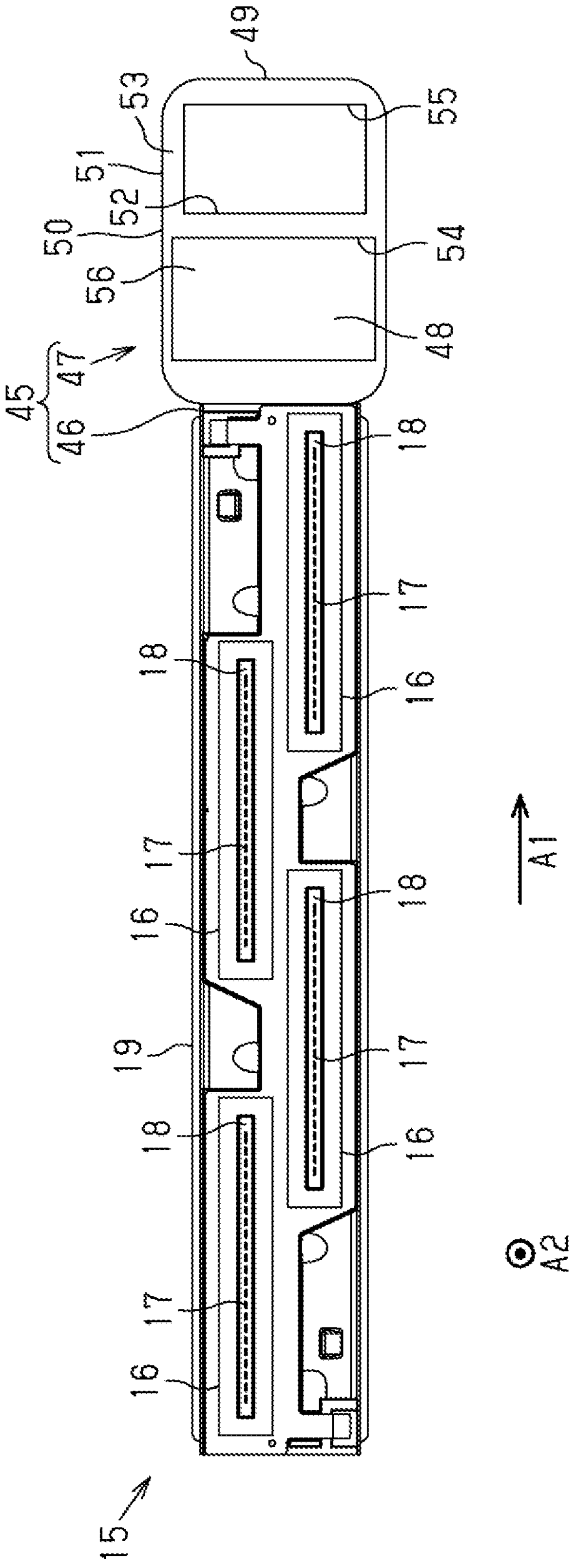
FIG. 3 is a bottom view of the ejecting unit and the cleaning unit.

As illustrated in FIGS. 1, 2, and 3, the liquid ejecting device 11 includes the ejecting unit 15. The ejecting unit 15 is configured to eject liquid. The ejecting unit 15 includes one or more heads 16. In one example, the ejecting unit 15 includes the four heads 16. The head 16 includes a nozzle surface 18 at which one or more nozzles 17 open. The head 16 ejects liquid from the nozzle 17. The plurality of nozzles 17 may form a nozzle row at the nozzle surface 18. In one example, the plurality of nozzles 17 form a nozzle row by being aligned in one direction A1. The one direction A1 is a direction in which a wiping section 26 to be described later moves.

The ejecting unit 15 may be a line head that can eject liquid simultaneously over a width of the medium 99. That is, the ejecting unit 15 may be configured to extend in the one direction A1. In this case, a length of the medium 99 in the one direction A1 indicates the width of the medium 99. For example, the plurality of heads 16 are aligned in the one direction A1. Specifically, the four heads 16 are aligned in two rows in the one direction A1. The four heads 16 are aligned in a staggered manner. Thus, the ejecting unit 15 extends in the one direction A1. The ejecting unit 15 may be a line head including one head 16 elongated in the one direction A1. The ejecting unit 15 is not limited to the line head, and may be a serial head for scanning with respect to the medium 99.

The ejecting unit 15 may include a liquid storage unit 19. The liquid storage unit 19 stores liquid. The liquid storage unit 19 is coupled to the head 16. The liquid stored in the liquid storage unit 19 is supplied to the head 16. The liquid storage unit 19 includes one or more coupling pipes 20. One end of a supply flow path (not illustrated) is coupled to each of the one or more coupling pipes 20. Another end of the supply flow path is coupled to a liquid container (not illustrated). Liquid contained in the liquid container is supplied to the liquid storage unit 19 via the supply flow path and the coupling pipe 20.

The ejecting unit 15 is configured to move in a perpendicular direction A2. Specifically, the ejecting unit 15 is configured to move up and down with respect to the support portion 13. The perpendicular direction A2 is a direction perpendicular to the nozzle surface 18. The perpendicular direction A2 indicates, for example, a vertical direction. The ejecting unit 15 approaches the maintenance unit 21 by moving in the perpendicular direction A2. At this time, the ejecting unit 15 may approach the maintenance unit 21 by entering the opening 14. The ejecting unit 15 is maintained by the maintenance unit 21 by approaching the maintenance unit 21.

Figure 4:
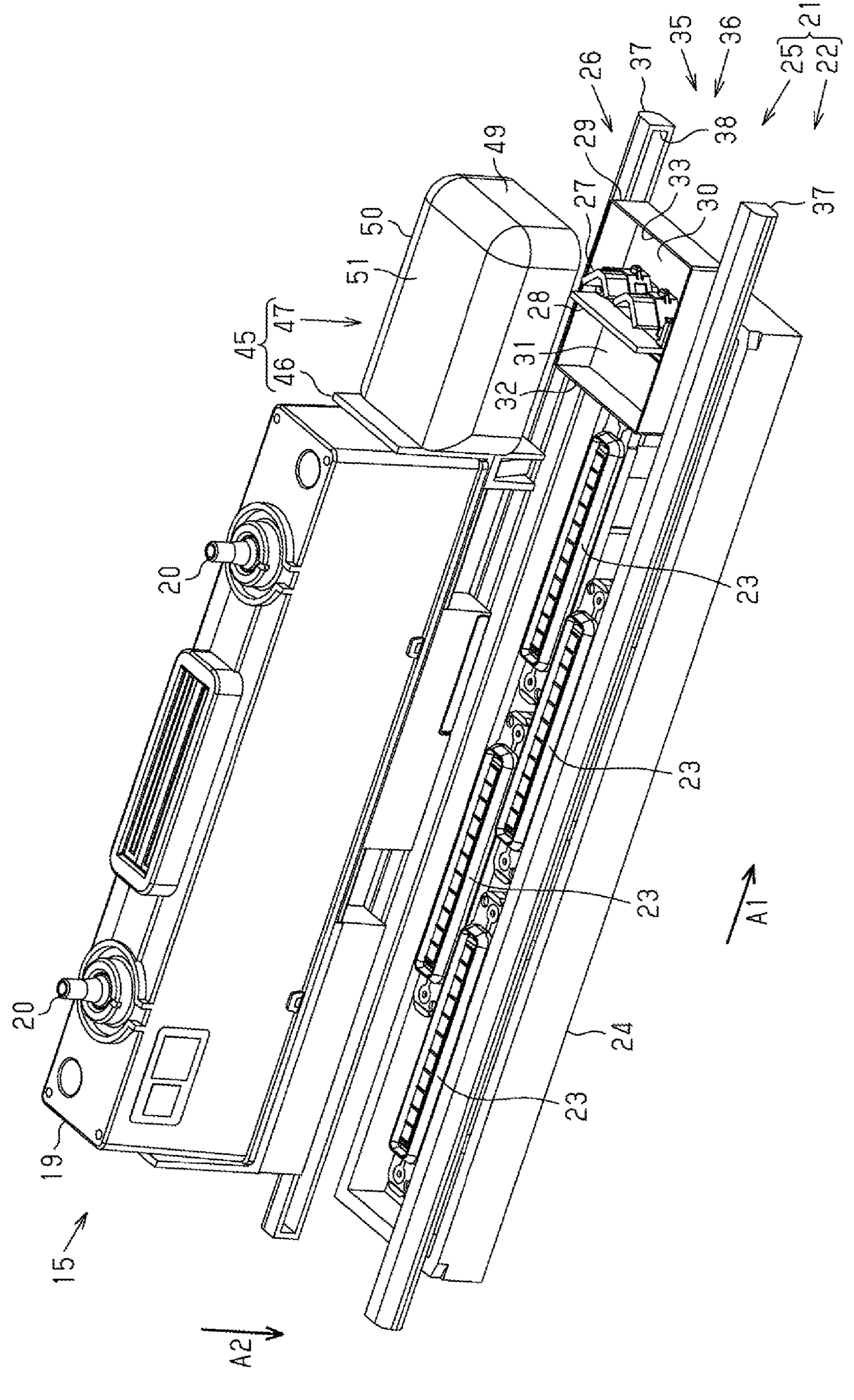
FIG. 4 is a perspective view as viewed in an angle different from that in FIG. 2.
Figure 5:
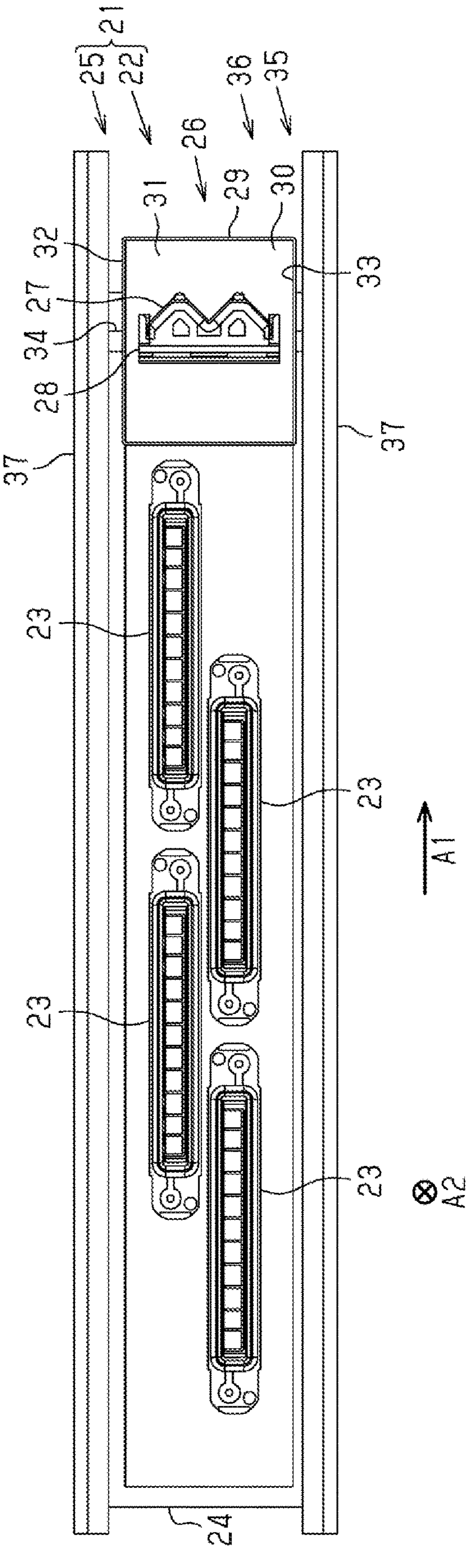
FIG. 5 is a top view of the wiper unit and the cap unit.

As illustrated in FIG. 4, and FIG. 5, the liquid ejecting device 11 includes the maintenance unit 21. The maintenance unit 21 is configured to maintain the ejecting unit 15. The maintenance unit 21 maintains the ejecting unit 15 by, for example, capping and wiping. The maintenance unit 21 is positioned opposite to the ejecting unit 15 with respect to the support portion 13. In one example, the maintenance unit 21 is positioned below the support portion 13. Therefore, in the perpendicular direction A2, the ejecting unit 15, the support portion 13, and the maintenance unit 21 are aligned in this order.

The maintenance unit 21 comes into contact with the ejecting unit 15 to maintain the ejecting unit 15. The maintenance unit 21 may be configured to approach the ejecting unit 15. That is, the maintenance unit 21 may be configured to move in the perpendicular direction A2. For example, the cap unit 22 may be configured to move up and down with respect to the support portion 13. The maintenance unit 21 may approach the ejecting unit 15 by entering the opening 14.

The maintenance unit 21 includes the cap unit 22. The cap unit 22 is configured to perform capping. The cap unit 22 is configured to maintain the ejecting unit 15 by the capping. The capping is operation for forming a space in communication with the nozzle 17 by coming into contact with the ejecting unit 15. The nozzle 17 is kept moisturized by the capping. In this manner, a possibility of the nozzle 17 becoming clogged is reduced.

The cap unit 22 includes one or more caps 23. The cap unit 22 includes, for example, the same number of caps 23 as the heads 16. In one example, the cap unit 22 includes the four caps 23. The four caps 23 come into contact with the four heads 16, respectively. Specifically, the four caps 23 come into contact with the four nozzle surfaces 18, respectively. In this manner, each of the four caps 23 forms a space in communication with the nozzle 17. In this way, in one example, in the cap unit 22, the heads 16 are capped one by one by the plurality of caps 23. In the cap unit 22, the plurality of heads 16 may be capped by one cap 23.

The four caps 23 are positioned so as to correspond to the four heads 16. The four caps 23 are aligned in the one direction A1. Specifically, the four caps 23 are aligned in two rows in the one direction A1. The four caps 23 are aligned in a staggered manner.

The cap unit 22 may include a base member 24. The base member 24 is a member that supports the cap 23. The base member 24 is, for example, a tray. The base member 24 may receive liquid leaked from the cap 23. In this case, a possibility that an inside of the liquid ejecting device 11 is contaminated is reduced.

The cap unit 22 may be configured to approach the ejecting unit 15. That is, the cap unit 22 may be configured to move in the perpendicular direction A2. For example, the cap unit 22 may be configured to move up and down with respect to the support portion 13. The cap unit 22 may approach the ejecting unit 15 by entering the opening 14. In one example, the ejecting unit 15 comes into contact with the cap unit 22 by entering the opening 14. The ejecting unit 15 may be capped by approaching the cap unit 22, or the ejecting unit 15 and the cap unit 22 may approach each other to cap the ejecting unit 15.

The maintenance unit 21 includes a wiper unit 25. The wiper unit 25 is configured to perform wiping. The wiper unit 25 is configured to maintain the ejecting unit 15 by the wiping. The wiping is operation for wiping the nozzle surface 18. By the wiping, liquid, foreign materials, and the like adhering to the nozzle surface 18 are removed.

The wiper unit 25 includes the wiping section 26. The wiping section 26 is configured to wipe the nozzle surface 18. The wiping section 26 includes one or more wipers. In one example, the wiping section 26 includes two wipers. The wiping section 26 includes, for example, a first wiper 27 and a second wiper 28. The first wiper 27 and the second wiper 28 are aligned in the one direction A1. Specifically, the second wiper 28 and the first wiper 27 are aligned in this order in the one direction A1.

The wiping section 26 wipes the ejecting unit 15 by moving in the one direction A1. In the wiping, the wiper comes into contact with the nozzle surface 18. The wiping section 26 sequentially wipes the plurality of heads 16 aligned in the one direction A1. By the wiping section 26 moving in the one direction A1, the first wiper 27 and the second wiper 28 wipe the nozzle surface 18 in this order. The wiping section 26 wipes the nozzle surface 18 with the two wipers to remove liquid and foreign materials from the nozzle surface 18.

The wiping section 26 includes a holding unit 29. The holding unit 29 holds the wiper. In one example, the holding unit 29 holds the first wiper 27 and the second wiper 28. The holding unit 29 receives liquid wiped by the wiper. Specifically, the holding unit 29 receives liquid flowing along the wiper. The holding unit 29 is constituted by a box, a tray, or the like in which an upper portion opens.

The holding unit 29 includes a bottom surface 30. The bottom surface 30 is a surface at which the holding unit 29 receives liquid from the wiper. Liquid wiped by the wiping section 26 is accumulated on the bottom surface 30. The bottom surface 30 is perpendicular to the wiper.

The holding unit 29 includes a bottom wall 31. The bottom wall 31 includes the bottom surface 30. In one example, the bottom wall 31 has a rectangular shape when viewed from a position facing the bottom surface 30. A wiper is attached to the bottom wall 31.

The holding unit 29 includes a side wall 32. The side wall 32 extends perpendicularly from the bottom wall 31. In one example, the side walls 32 extend perpendicularly from four sides of the bottom wall 31. A wiper may be attached to the side wall 32.

An accommodation opening 33 is formed at the holding unit 29 by the side wall 32. The accommodation opening 33 is an opening formed by an upper end of the side wall 32. The wiper protrudes from the accommodation opening 33. Liquid flows from the wiper to the holding unit 29 through the accommodation opening 33.

The holding unit 29 includes a guide shaft 34. The guide shaft 34 is a shaft that guides the holding unit 29. The holding unit 29 is guided in the one direction A1 by the guide shaft 34. That is, the wiping section 26 is guided in the one direction A1 by the guide shaft 34.

The holding unit 29 normally stands by at a position different from a position of the ejecting unit 15 in the one direction A1. That is, the holding unit 29 normally stands by at a position that does not overlap the ejecting unit 15 when viewed from the perpendicular direction A2. Specifically, the holding unit 29 normally stands by at a position shifted from the ejecting unit 15 in the one direction A1. The holding unit 29 may stand by at a position shifted from the ejecting unit 15 in an opposite direction of the one direction A1.

The holding unit 29 may be subjected to a liquid-repellent treatment. In particular, the bottom surface 30 is desirably subjected to the liquid-repellent treatment. The liquid-repellent treatment is a treatment for enhancing liquid repellency. The liquid-repellent treatment is, for example, a treatment of applying a coating agent. The liquid-repellent treatment increases a contact angle of liquid at the holding unit 29. Accordingly, liquid easily flows on a surface of the holding unit 29.

The wiper unit 25 includes a moving unit 35. The moving unit 35 is configured to move the wiping section 26. The moving unit 35 is configured to move the wiping section 26 in the one direction A1. Specifically, the moving unit 35 reciprocates the wiping section 26 in the one direction A1. By the moving unit 35 moving the wiping section 26, the wiping section 26 wipes the nozzle surface 18.

The moving unit 35 includes a guide mechanism 36. The guide mechanism 36 is a mechanism that guides the wiping section 26. The guide mechanism 36 guides the wiping section 26 so as to move in the one direction A1. The guide mechanism 36 includes, for example, two guide rails 37. The guide rail 37 is a rail that guides the wiping section 26. The guide rail 37 extends in the one direction A1. A guide groove 38 is formed at the guide rail 37. The guide shaft 34 is inserted into the guide groove 38. Accordingly, the wiping section 26 moves along the guide rail 37.

Figure 6:
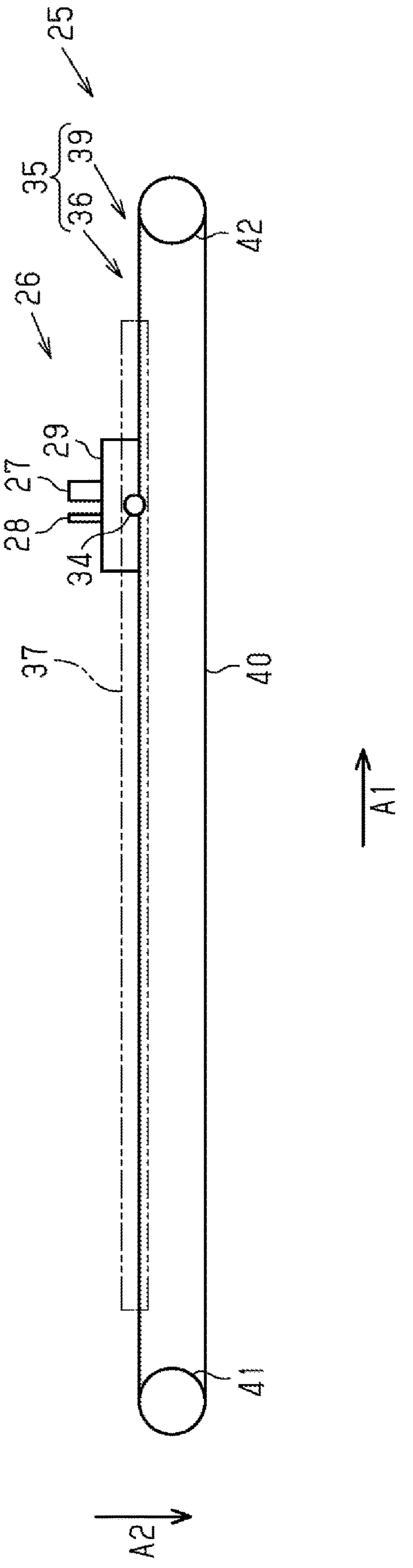
FIG. 6 is a front view illustrating a moving unit.

As illustrated in FIG. 6, the moving unit 35 includes a moving mechanism 39. The moving mechanism 39 is a mechanism that moves the wiping section 26 in the one direction A1. The moving mechanism 39 includes, for example, a timing belt 40, a first roller 41, and a second roller 42. The timing belt 40 is wound around the first roller 41 and the second roller 42. The holding unit 29 is attached to the timing belt 40. As the first roller 41 and the second roller 42 rotate, the timing belt 40 rotates along the first roller 41 and the second roller 42. Accordingly, the holding unit 29 moves in the one direction A1. The moving mechanism 39 is not limited to being configured by the timing belt 40, the first roller 41, and the second roller 42, and may be configured by a ball screw, for example.

Figure 19:
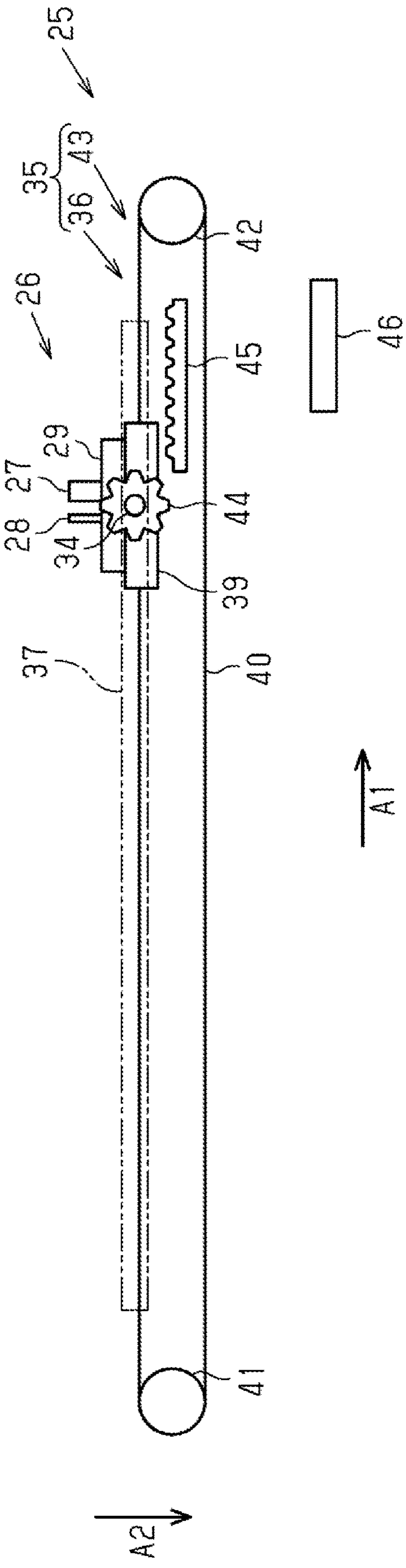
FIG. 19 is a front view illustrating the moving unit.
Figure 20:
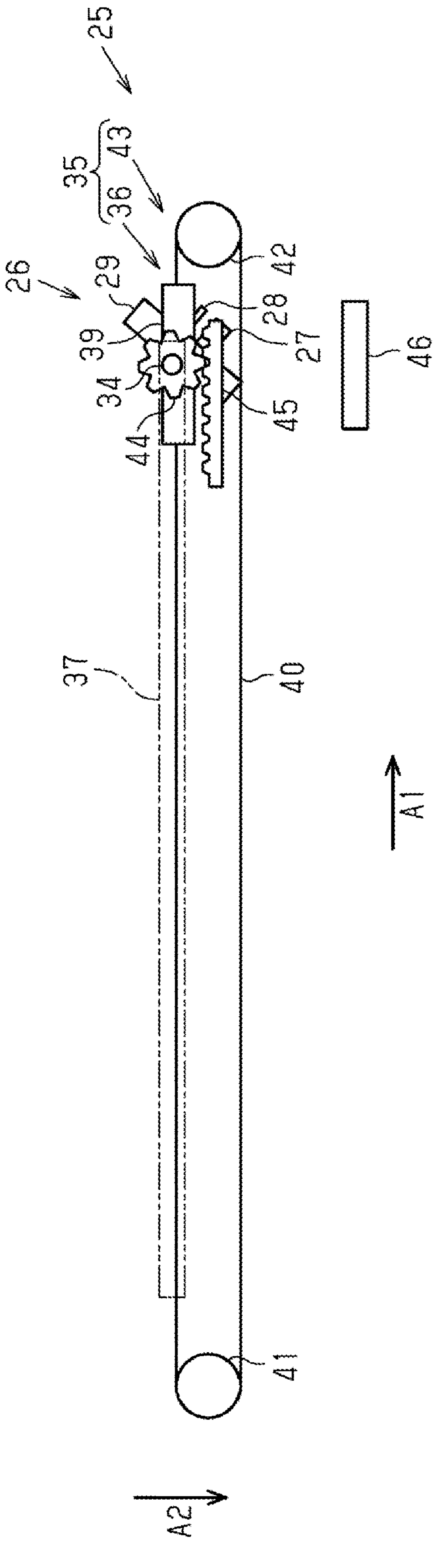
FIG. 20 is a front view when a wiping section rotates.

As illustrated in FIGS. 19 and 20, the moving unit 35 may include a moving mechanism 65 different from the moving mechanism 39. The moving mechanism 65 may include a mobile body 66. The wiping section 26 is mounted at the mobile body 66. Specifically, the mobile body 66 is attached to the holding unit 29. By the mobile body 66 moving, the holding unit 29 moves.

The moving mechanism 65 may include the timing belt 40, the first roller 41, and the second roller 42. The timing belt 40 is wound around the first roller 41 and the second roller 42. The mobile body 66 is attached to the timing belt 40. As the first roller 41 and the second roller 42 rotate, the timing belt 40 rotates along the first roller 41 and the second roller 42. Thus, the mobile body 66 moves in the one direction A1. The moving mechanism 65 is not limited to moving the mobile body 66 by the timing belt 40, and may move the mobile body 66 by a ball screw, for example.

The moving unit 35 includes a rotation mechanism 43. The rotation mechanism 43 is configured to rotate the wiping section 26. When the rotation mechanism 43 rotates the wiping section 26, the holding unit 29 faces downward. That is, the bottom surface 30 faces downward. At this time, the opening 33 also faces downward. As a result, liquid drops from the holding unit 29. Therefore, the liquid is discharged from the holding unit 29.

The rotation mechanism 43 includes a pinion 44. The pinion 44 is attached to the wiping section 26. Specifically, the pinion 44 is attached to the holding unit 29. In one example, the pinion 44 is fixed to the guide shaft 34. The pinion 44 moves in the one direction A1 together with the holding unit 29. By the pinion 44 rotating, the holding unit 29 rotates about the guide shaft 34. At this time, the holding unit 29 rotates with respect to the mobile body 66.

The rotation mechanism 43 includes a rack 63. The rack 63 extends in the one direction A1. That is, the rack 63 extends along the guide rail 37. The rack 63 meshes with or disengages from the pinion 44 as the wiping section 26 moves in the one direction A1. The rack 63 is positioned so as to mesh with the pinion 44 when the wiping section 26 is positioned in a predetermined region. During wiping, the rack 63 does not mesh with the pinion 44. Therefore, the rack 63 is positioned in a region different from a region where the pinion 44 is positioned during the wiping. The rack 63 meshes with the pinion 44 in a region where the wiping section 26 does not overlap the ejecting unit 15 when viewed from the perpendicular direction A2.

By the mobile body 66 moving in the one direction A1, the pinion 44 meshes with the rack 63. That is, the pinion 44 meshes with the rack 63 when the moving mechanism 65 moves the wiping section 26 in the one direction A1. When the mobile body 66 moves in the one direction A1 in a state in which the pinion 44 meshes with the rack 63, the pinion 44 rotates while meshing with the rack 63. By the pinion 44 rotating, the wiping section 26 rotates. Therefore, the rotation mechanism 43 rotates the wiping section 26 by power of the moving mechanism 65. Accordingly, it is possible to simplify the configuration of the liquid ejecting device 11 compared to a case where the moving mechanism 65 and the rotation mechanism 43 each have separate power.

The liquid ejecting device 11 includes a receiving portion 64. The receiving portion 64 receives liquid discharged from the holding unit 29. The receiving portion 64 is positioned below the rotating holding unit 29. That is, the receiving portion 64 is positioned below the wiping section 26 in a state in which the pinion 44 and the rack 63 mesh with each other. The receiving portion 64 is positioned, for example, below the rack 63. As a result, liquid falling from the holding unit 29 through the opening 33 is received by the receiving portion 64.

The receiving portion 64 is positioned at a position different from that of the ejecting unit 15 in the one direction A1. That is, the receiving portion 64 is positioned at a position that does not overlap the ejecting unit 15 when viewed from the perpendicular direction A2. Accordingly, when liquid is discharged from the holding unit 29, a possibility that the wiping section 26 interferes with the ejecting unit 15 is reduced. When liquid is discharged from the holding unit 29, the wiping section 26 rotates immediately above the receiving portion 64. Therefore, when the receiving portion 64 and the ejecting unit 15 overlap each other when viewed from the perpendicular direction A2, the wiping section 26 is likely to interfere with the ejecting unit 15 by rotating between the receiving portion 64 and the ejecting unit 15.

As illustrated in FIGS. 1, 2, and 3, the liquid ejecting device 11 includes a cleaning unit 45. The cleaning unit 45 is configured to perform cleaning on the wiper unit 25. The cleaning unit 45 is attached to the ejecting unit 15.

The cleaning unit 45 includes an attachment portion 46. The attachment portion 46 is a portion attached to the ejecting unit 15. The attachment portion 46 is attached to the liquid storage unit 19, for example. In one example, the attachment portion 46 is attached to a lower portion of the liquid storage unit 19. The attachment portion 46 is attached to the liquid storage unit 19 so as to expose the head 16. The attachment portion 46 is positioned so as to overlap the liquid storage unit 19 when viewed from the perpendicular direction A2, for example.

The cleaning unit 45 includes a cleaner 47. The cleaner 47 comes into contact with the wiper. In one example, the cleaner 47 comes into contact with the first wiper 27 and the second wiper 28. The cleaner 47 performs cleaning on the wiper by coming into contact with the wiper. Specifically, the cleaner 47 removes liquid, foreign materials, and the like adhering to the wiper by coming into contact with the wiper. The cleaner 47 is attached to the attachment portion 46.

A distance between the cleaner 47 and the wiping section 26 in the perpendicular direction A2 is greater than a distance between the ejecting unit 15 and the wiping section 26 in the perpendicular direction A2. For example, the cleaner 47 is positioned above the nozzle surface 18. That is, the cleaner 47 is positioned at a position recessed from the nozzle surface 18 with respect to the wiper.

During capping, a position of the cleaner 47 in the perpendicular direction A2 overlaps a position of the wiper at in the perpendicular direction A2. That is, during the capping, the wiper overlaps the cleaner 47 when viewed from the one direction A1. Specifically, during the capping, a tip of the wiper overlaps the cleaner 47 when viewed from the one direction A1. Therefore, in a positional relationship between the ejecting unit 15 and the wiping section 26 during the capping, the tip of the wiper reaches the cleaner 47. In the positional relationship between the ejecting unit 15 and the wiping section 26 during the capping, the cleaner 47 is positioned at a position recessed from the nozzle surface 18 so as to be able to come into contact with the wiper with a pressure of a degree that does not hinder the capping. Therefore, the cleaner 47 can clean the wiper in a state in which the ejecting unit 15 is capped.

During wiping, a position of the cleaner 47 in the perpendicular direction A2 does not overlap a position of the wiper in the perpendicular direction A2. That is, during the wiping, the wiper does not overlap the cleaner 47 when viewed from the one direction A1. Specifically, during the wiping, the tip of the wiper does not overlap the cleaner 47 when viewed from the one direction A1. Therefore, in a positional relationship between the ejecting unit 15 and the wiping section 26 during the wiping, the tip of the wiper does not reach the cleaner 47. In the positional relationship between the ejecting unit 15 and the wiping section 26 during the wiping, the cleaner 47 is positioned at a position recessed from the nozzle surface 18 so that the cleaner 47 does not come into contact with the tip of the wiper even when the wiping section 26 moves in the one direction A1.

The cleaner 47 is positioned at a position where the tip of the wiper can reach the cleaner 47 during capping and the tip of the wiper cannot reach the cleaner 47 during wiping. Therefore, even when the wiping section 26 is positioned at a position facing the cleaner 47, it is possible to cap the ejecting unit 15. Therefore, it is not necessary to retract the wiping section 26 from the cleaner 47 for capping. Accordingly, an increase in a size of the liquid ejecting device 11 is suppressed.

The cleaner 47 is positioned at a position different from that of the ejecting unit 15 in the one direction A1. That is, the cleaner 47 is positioned at a position that does not overlap the ejecting unit 15 when viewed from the perpendicular direction A2. For example, the cleaner 47 is positioned so as to be aligned with the ejecting unit 15 in the one direction A1. In one example, the cleaner 47 is positioned at a position shifted from the ejecting unit 15 in the one direction A1.

By the ejecting unit 15 moving in the perpendicular direction A2, the cleaner 47 moves in the perpendicular direction A2. Accordingly, the cleaner 47 approaches the wiping section 26. By the cleaner 47 moving down, the cleaner 47 can come into contact with the wiping section 26 facing the cleaner 47. The cleaner 47 comes into contact with the wiping section 26 through the opening 14, for example.

The cleaner 47 includes a cleaning portion 48. The cleaning portion 48 is a portion of the cleaner 47 that cleans the wiper by coming into contact with the wiper. In one example, the cleaning portion 48 is an absorbing material 56 described below. The cleaning portion 48 may be formed of a protective member 50 described later.

The cleaner 47 may include a storage portion 49. The storage portion 49 is a portion of the cleaner 47 for storing the wiper. Since the wiper is stored in the storage portion 49, a possibility that liquid adhering to the wiper is solidified is reduced. The storage portion 49 is formed of the protective member 50.

The cleaning portion 48 and the storage portion 49 are aligned in the one direction A1 in the cleaner 47. In one example, the cleaning portion 48 and the storage portion 49 are aligned in this order in the one direction A1. As a result, the wiping section 26 moves in the one direction A1 to move to the cleaning portion 48 and the storage portion 49 in this order. Therefore, the wiper is smoothly stored by the storage portion 49 after being cleaned by the cleaning portion 48.

The cleaner 47 includes the protective member 50. The protective member 50 is a member that protects a wiper. The protective member 50 protects the wiper by cleaning the wiper, storing the wiper, or both.

The protective member 50 includes an outer wall 51. The outer wall 51 defines a storage space. A space surrounded by the outer wall 51 is the storage space. The storage space may be a space for storing the wiper or a space for storing the absorbing material 56. When the ejecting unit 15 moves in the perpendicular direction A2, the wiper reaches the storage space. Thus, the wiper is protected by the protective member 50.

The protective member 50 may include a partition wall 52. The partition wall 52 extends from the outer wall 51 so as to bisect the storage space. Thus, the two storage spaces are formed in the protective member 50. The two storage spaces may be a space for storing a wiper and a space for storing the absorbing material 56, respectively.

The protective member 50 includes a facing surface 53. The facing surface 53 is a surface that faces the wiping section 26. The facing surface 53 faces the perpendicular direction A2. The facing surface 53 is constituted by, for example, an end surface of the outer wall 51 and an end surface of the partition wall 52. The facing surface 53 is positioned above the nozzle surface 18.

One or more recessed portions are formed at the protective member 50. For example, a first recessed portion 54 and a second recessed portion 55 are formed at the protective member 50. The recessed portion opens at the facing surface 53. Therefore, at the protective member 50, the recessed portion opens in the perpendicular direction A2. The first recessed portion 54 and the second recessed portion 55 are constituted by the outer wall 51 and the partition wall 52. A space in the first recessed portion 54 and a space in the second recessed portion 55 are the storage spaces. The first recessed portion 54 and the second recessed portion 55 are aligned in the one direction A1. In one example, the first recessed portion 54 and the second recessed portion 55 are aligned in this order in the one direction A1.

The cleaner 47 may include the absorbing material 56. The absorbing material 56 is a member that absorbs liquid. The absorbing material 56 is stored in the first recessed portion 54, for example. When the wiper comes into contact with the absorbing material 56, the absorbing material 56 absorbs liquid adhering to the wiper. Thus, the wiper is cleaned. In this manner, the absorbing material 56 functions as the cleaning portion 48 of the cleaner 47 by absorbing the liquid adhering to the wiper.

In the cleaner 47, the absorbing material 56 is positioned in the first recessed portion 54, whereas the absorbing material 56 is not positioned in the second recessed portion 55. This is because the second recessed portion 55 is a recessed portion for storing the wiper. That is, in the protective member 50, a portion constituting the second recessed portion 55 is the storage portion 49. Specifically, in the protective member 50, a part of the outer wall 51 and the partition wall 52 correspond to the storage portion 49.

As illustrated in FIG. 1, the liquid ejecting device 11 includes a control unit 57. The control unit 57 controls the moving unit 35. The control unit 57 may control the ejecting unit 15, the cap unit 22, and the like. The control unit 57 may integrally control the liquid ejecting device 11.

The control unit 57 may be constituted by one or more processors that execute various processes according to a computer program. The control unit 57 may be constituted by one or more dedicated hardware circuits, such as an application specific integrated circuit, that execute at least some of the various processes. The control unit 57 may be constituted by a circuit including a combination of a processor and hardware circuits. The processor includes a CPU and a memory such as a RAM and a ROM. The memory stores program codes, or commands configured to cause the CPU to execute processing. The memory, that is, computer-readable medium includes any readable medium that can be accessed by a general purpose or special purpose computer.

Operation by Control Unit

Next, operation by the control unit 57 controlling the moving unit 35 will be described. The control unit 57 controls the moving unit 35 to perform wiping operation, cleaning operation, discharge operation, and the like. That is, by the moving unit 35 moving the wiping section 26, the wiping operation, the cleaning operation, and the discharge operation are performed.

First, the wiping operation will be described. The wiping operation is operation in which the control unit 57 causes the wiping section 26 to wipe the nozzle surface 18 by causing the moving unit 35 to move the wiping section 26.

Figure 7:
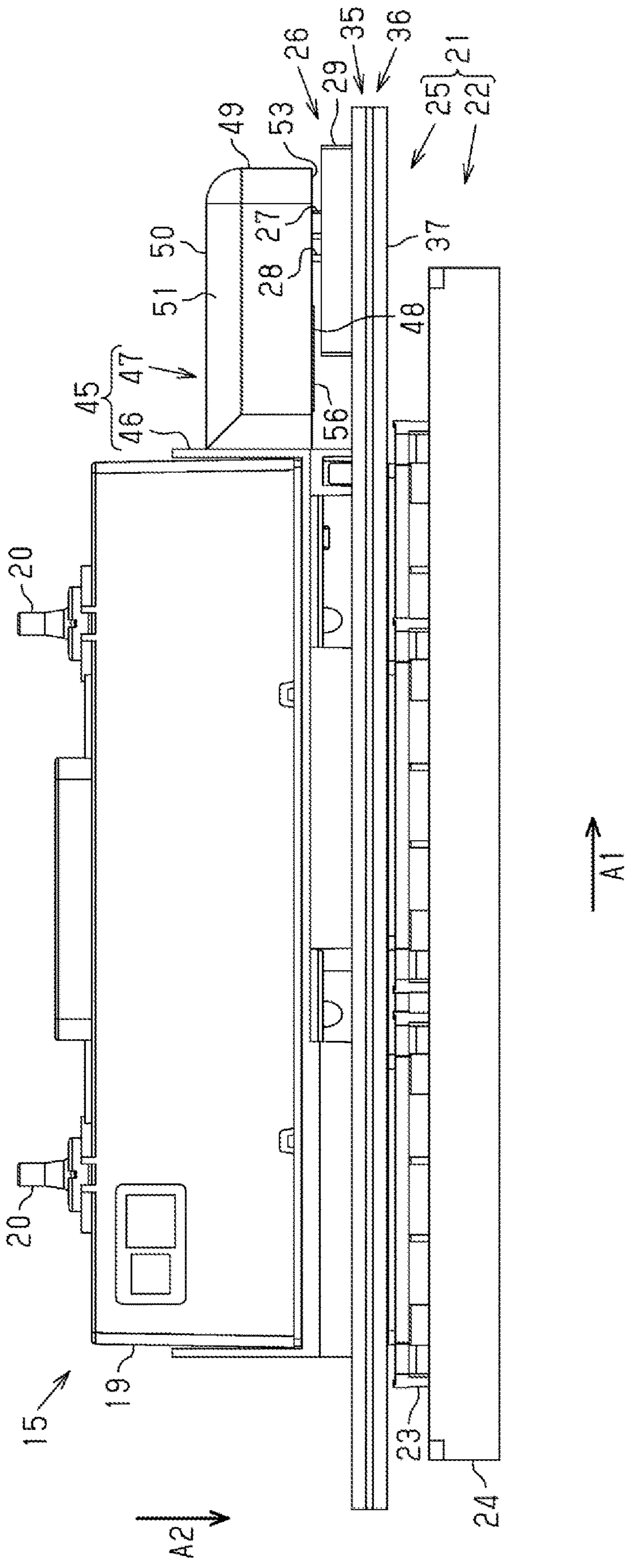
FIG. 7 is a front view when the wiper is stored.

As illustrated in FIG. 7, the ejecting unit 15 normally stands by in a capped state. At this time, the wiping section 26 is stored in the protective member 50. Specifically, the first wiper 27 and the second wiper 28 are stored in the second recessed portion 55. This reduces a possibility of solidification of liquid adhering to the wiper during the standby. For example, when printing is started, the ejecting unit 15 moves up to be separated from the cap 23. Accordingly, the wiper is exposed from the protective member 50.

Figure 8:
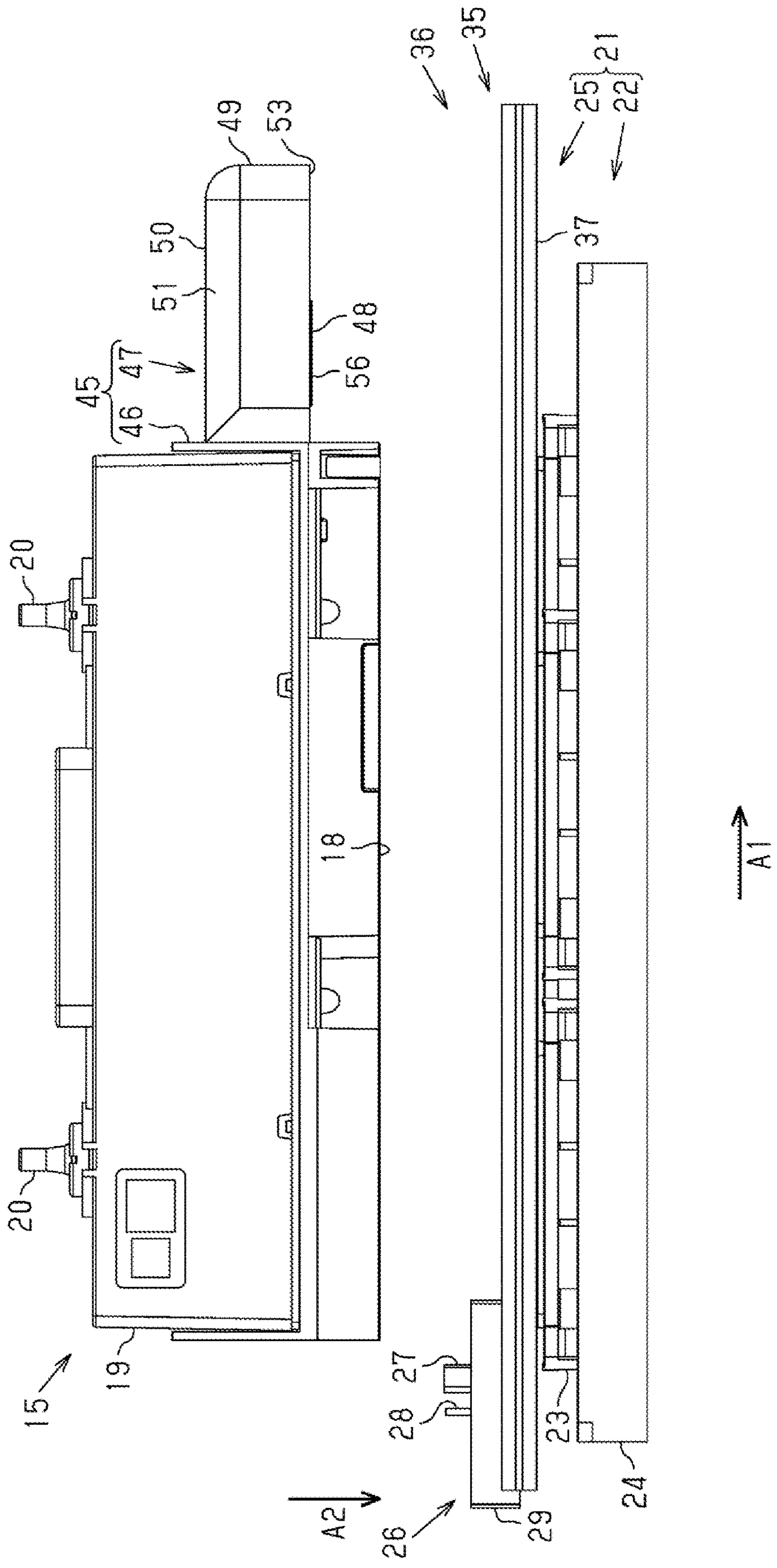
FIG. 8 is a front view when the wiper is positioned at a wiping start position.

As illustrated in FIG. 8, when the wiping operation is performed, the control unit 57 moves the wiping section 26 to a wiping start position. Specifically, the control unit 57 moves the wiping section 26 to a position shifted from the ejecting unit 15 in the opposite direction of the one direction A1. The wiping operation is performed, for example, after completion of printing.

Figure 9:
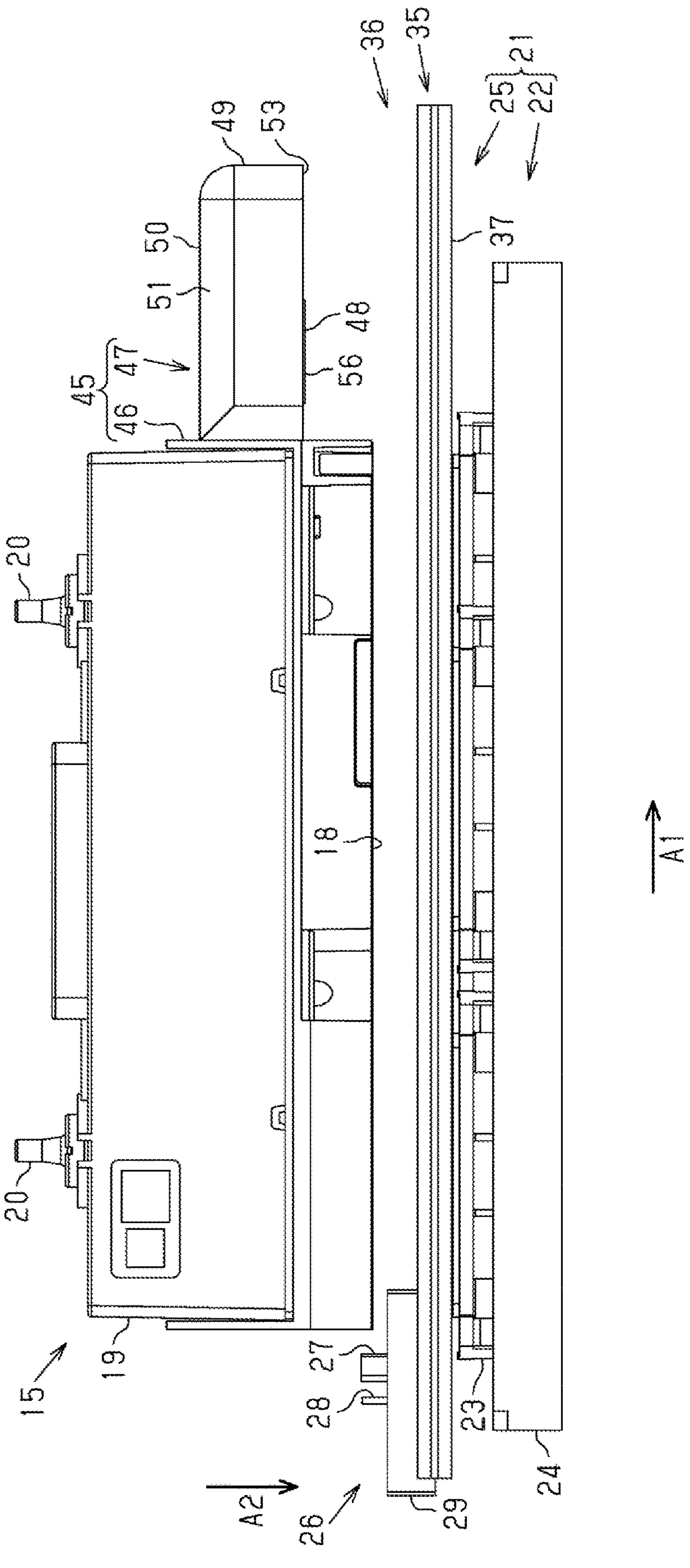
FIG. 9 is a front view when the wiping is started.

As illustrated in FIG. 9, when the wiping section 26 is positioned at the wiping start position, the ejecting unit 15 moves down. As a result, the tip of the wiper reaches the ejecting unit 15. That is, when viewed from the one direction A1, the wiper overlaps the ejecting unit 15. Therefore, the tip of the wiper can contact the nozzle surface 18.

Figure 10:
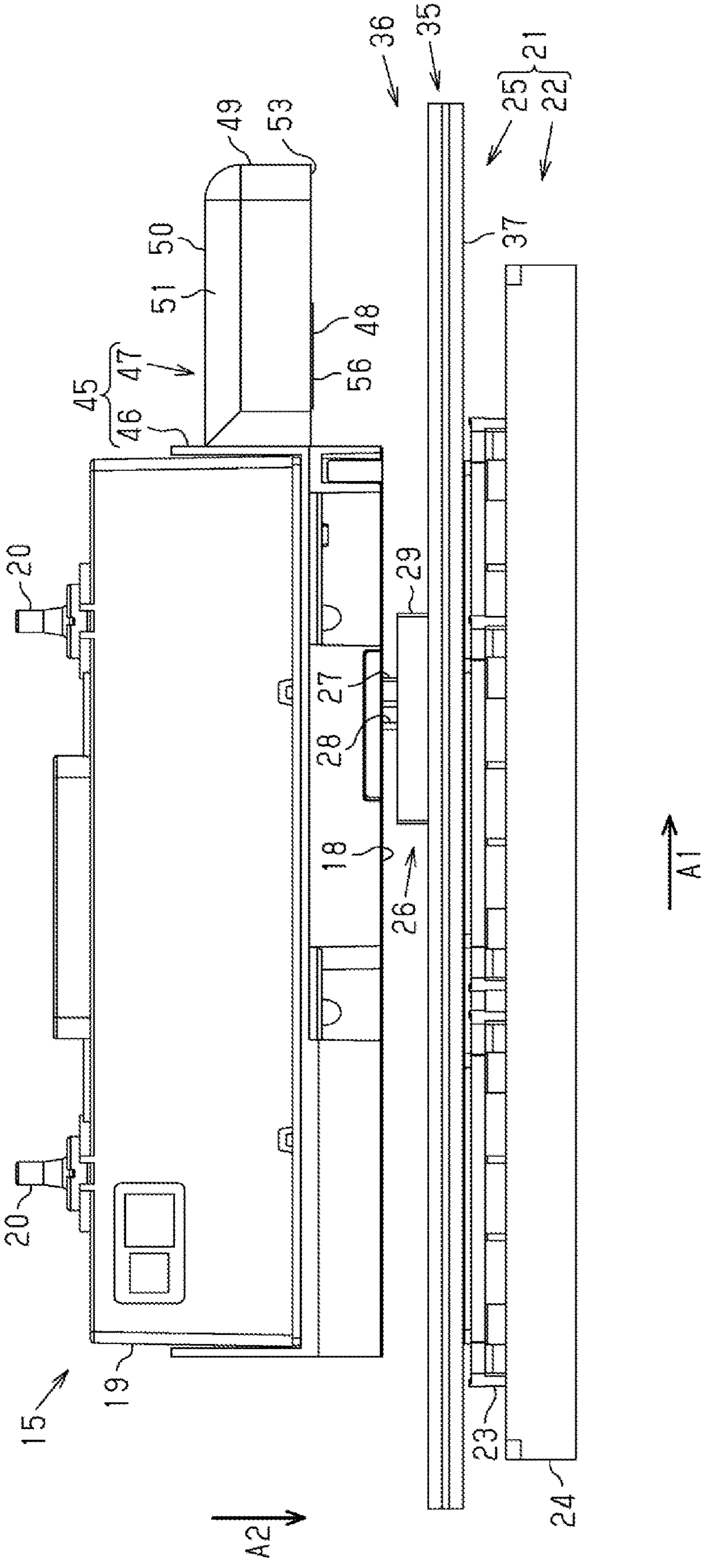
FIG. 10 is a front view in the middle of wiping.

As illustrated in FIG. 10, when the tip of the wiper can come into contact with the nozzle surface 18, the control unit 57 causes the moving unit 35 to move the wiping section 26 in the one direction A1. Accordingly, the wiping section 26 wipes the nozzle surface 18.

Figure 11:
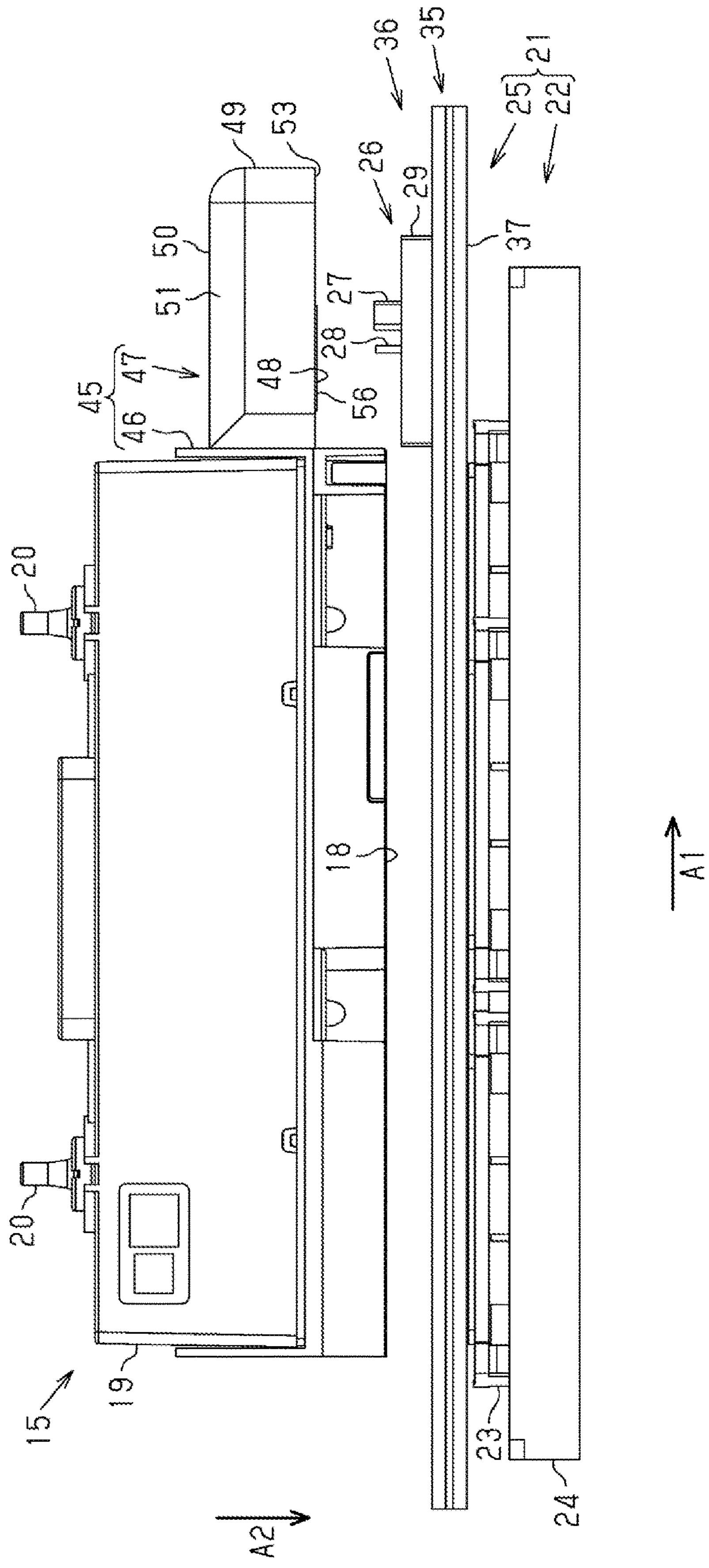
FIG. 11 is a front view when the wiping is completed.

As illustrated in FIG. 11, when the wiping section 26 finishes wiping the nozzle surface 18, the control unit 57 stops the moving unit 35. That is, when the wiping section 26 is past a region facing the ejecting unit 15, the control unit 57 stops the wiping section 26. Thus, the wiping operation is completed. At this time, the wiping section 26 stops at a position facing the cleaner 47. Specifically, the wiping section 26 stops in a state in which the wiper is positioned directly below the first recessed portion 54.

Next, the cleaning operation will be described. The cleaning operation is operation in which the control unit 57 causes the cleaner 47 to clean the wiper by causing the moving unit 35 to move the wiping section 26.

Figure 12:
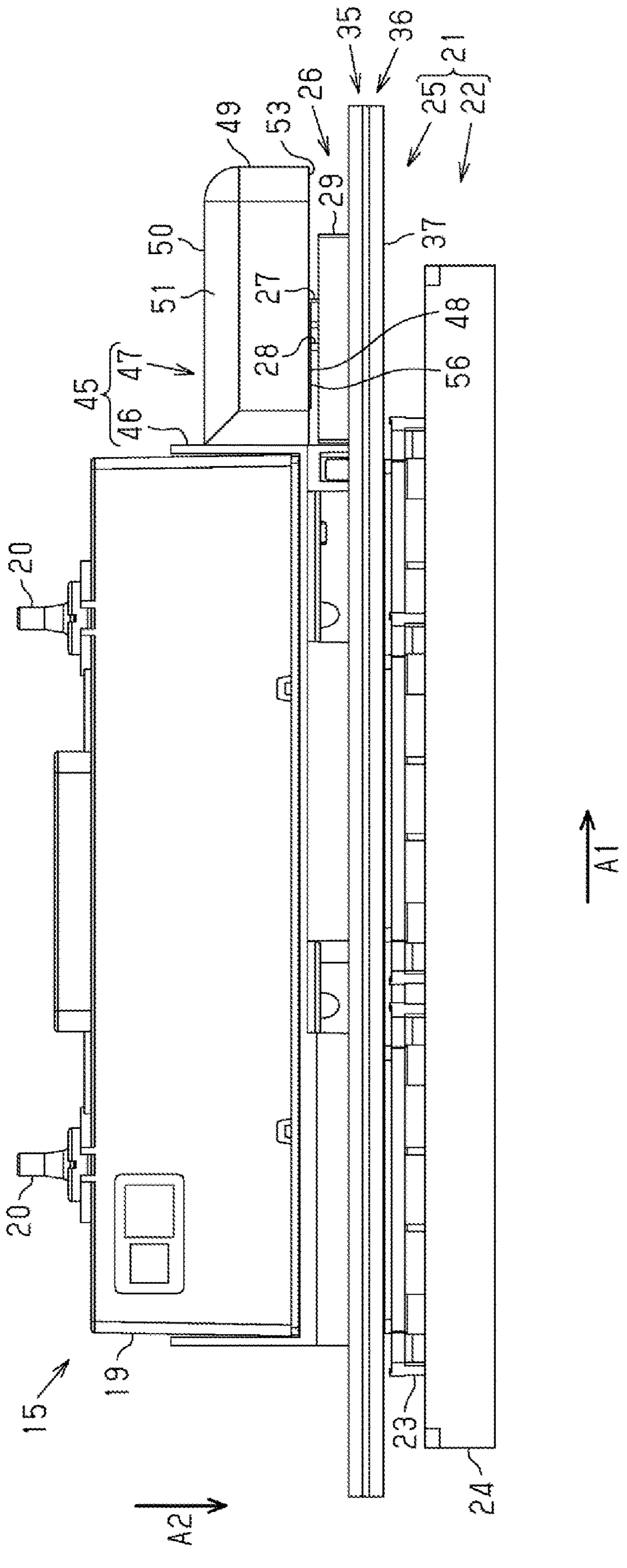
FIG. 12 is a front view when the wiper is cleaned.

As illustrated in FIG. 12, when the cleaning operation is performed, the ejecting unit 15 moves down in a state in which the wiping section 26 is positioned at a position facing the cleaner 47. At this time, the ejecting unit 15 may be capped. That is, the cleaning operation may be performed in a state in which the ejecting unit 15 is capped. In this case, cleaning is performed in parallel with the capping. The cleaning operation may be performed in a state in which the ejecting unit 15 is not capped. For example, the cleaning operation may be performed in a state in which a gap is formed between the nozzle surface 18 and the cap 23.

The tip of the wiper reaches the cleaner 47 by the ejecting unit 15 moving down. That is, when viewed from the one direction A1, the wiper overlaps the cleaner 47. Thus, the tip of the wiper can come into contact with the cleaning portion 48. In one example, the tip of the wiper comes into contact with the absorbing material 56.

The control unit 57 causes the moving unit 35 to move the wiping section 26 in the one direction A1 in a state in which the wiper is in contact with the cleaning portion 48. At this time, the wiping section 26 moves while the wiper rubs against the cleaning portion 48. Thus, the wiper is cleaned by the cleaning portion 48.

The control unit 57 causes the wiper to be stored in the storage portion 49 by moving the wiper in the one direction A1 in a state in which the wiper is in contact with the cleaning portion 48. When the cleaning operation is performed in a state in which the ejecting unit 15 is capped, the control unit 57 causes the wiper to be stored in the storage portion 49 by moving the wiper in the one direction A1 in a state in which the wiper is in contact with the cleaning portion 48 during the capping. That is, when movement of the wiper from the first recessed portion 54 to the second recessed portion 55 is completed, the control unit 57 stops the wiping section 26. Thus, the clean operation is completed. The wiper is protected by being stored in the second recessed portion 55. When the cleaning operation is completed, the ejecting unit 15 and the wiping section 26 stand by again. After completion of the cleaning operation, the ejecting unit 15 may be capped.

After completion of the cleaning operation, the cleaner 47 may come into contact with the holding unit 29. Specifically, after completion of the cleaning operation, the facing surface 53 may come into contact with the holding unit 29. For example, when the ejecting unit 15 further moves down after the cleaning operation is completed, the facing surface 53 comes into contact with the holding unit 29. This further reduces the possibility that liquid adhering to the wiper is solidified. The cleaning operation may be performed in a state in which the cleaner 47 is in contact with the holding unit 29.

Comparative Example

Next, a comparative example will be described. The comparative example is an example in which the cleaner 47 is positioned such that the facing surface 53 and the nozzle surface 18 are positioned at the same height. Therefore, in the comparative example, the wiper overlaps the cleaner 47 when viewed from the one direction A1 during wiping.

Figure 13:
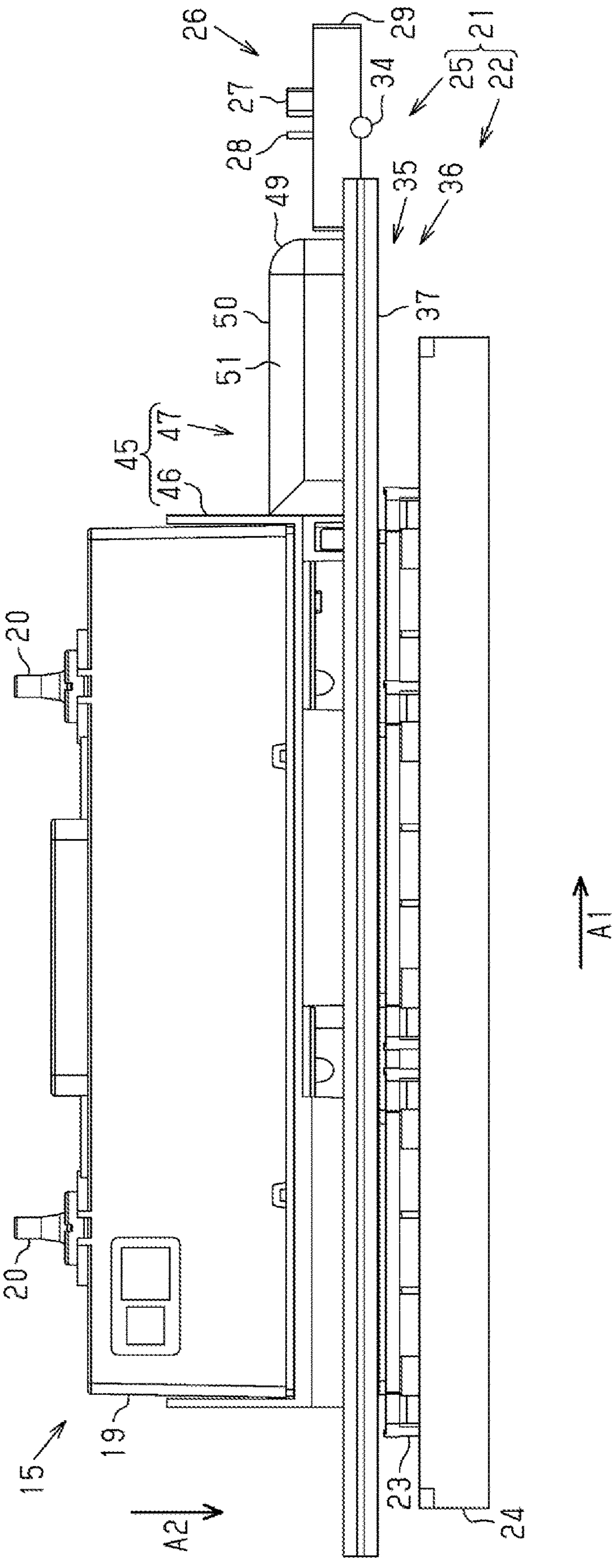
FIG. 13 is a front view illustrating a comparative example of the cleaning unit.

As illustrated in FIG. 13, in the comparative example, when the ejecting unit 15 is capped, the wiping section 26 needs to be retracted from the cleaner 47. Specifically, when the ejecting unit 15 is capped, the wiping section 26 needs to be retracted to a position shifted from the cleaner 47 in the one direction A1. This is because the wiping section 26 may interfere with the cleaner 47 when the ejecting unit 15 approaches the cap unit 22. In particular, when the holding unit 29 interferes with the protective member 50, the ejecting unit 15 cannot move down. That is, the wiping section 26 hinders capping. Therefore, when the ejecting unit 15 is capped, the wiping section 26 is retracted from the cleaner 47, thus a movement amount of the wiping section 26 increases. In this regard, in the example described above, since it is not necessary to retract the wiping section 26 from the cleaner 47 when the ejecting unit 15 is capped, a possibility that the liquid ejecting device 11 is increased in size is reduced.

In the comparative example, since the wiping section 26 is retracted from the cleaner 47 during capping, cleaning and the capping cannot be performed in parallel. Therefore, for example, after the wiper is cleaned, the ejecting unit 15 is capped. In this case, since it takes time until the ejecting unit 15 is capped, there is a possibility that clogging of the nozzle 17 may easily occur. In this regard, in the above-described example, since cleaning can be performed while capping is performed, a time until the ejecting unit 15 is capped is reduced.

Actions and Effects

Next, actions and effects of the example described above will be described.

(1) The position of the cleaner 47 in the perpendicular direction A2 overlaps the position of the wiper in the perpendicular direction A2 during the capping. The position of the cleaner 47 in the perpendicular direction A2 does not overlap the position of the wiper at the perpendicular direction A2 during the wiping. During the capping, the wiper overlaps the cleaner 47 when viewed from the one direction A1, whereas during the wiping, the wiper does not overlap the cleaner 47 when viewed from the one direction A1. That is, the cleaner 47 is positioned at a position recessed from the nozzle surface 18 with respect to the wiper. Therefore, in a state in which the wiper is in contact with the cleaner 47, the cap unit 22 can cap the ejecting unit 15. Therefore, according to the above-described configuration, it is not necessary to retract the wiper from the cleaner 47 during the capping. Accordingly, an increase in a size of the liquid ejecting device 11 is suppressed.

(2) The cleaning portion 48 and the storage portion 49 are aligned in the one direction A1. According to the above configuration, the wiper is smoothly stored by the storage portion 49 after being cleaned by the cleaning portion 48 by moving in the one direction A1.

(3) The control unit 57, during the capping, causes the wiper to be stored in the storage portion 49 by moving the wiper in the one direction A1 in a state in which the wiper is in contact with the cleaning portion 48. According to the above-described configuration, in a state in which the ejecting unit 15 is capped, the wiper is cleaned by the cleaning portion 48 and then stored by the storage portion 49. Therefore, a movement amount of the ejecting unit 15 is reduced compared to a configuration in which the ejecting unit 15 moves after cleaning of the wiper in order to store the wiper.

(4) The cleaner 47 is positioned at a position that does not overlap the ejecting unit 15 when viewed from the perpendicular direction A2. According to the configuration described above, the wiper is less likely to interfere with the ejecting unit 15 during the capping.

(5) The cap unit 22 includes the plurality of caps 23 that cap the plurality of heads 16, respectively. According to the above-described configuration, capping accuracy is improved compared to a case where one cap 23 caps the plurality of heads 16.

Next, the discharge operation will be described. The discharge operation is operation in which the control unit 57 causes the bottom surface 30 to face downward by causing the moving unit 35 to move the wiping section 26. That is, the discharge operation is operation in which the control unit 57 causes liquid to be discharged from the holding unit 29. In one example, the discharge operation is operation in which the control unit 57 moves the wiping section 26 in the one direction A1 to cause the pinion 44 to mesh with the rack 63 and to rotate. Thus, the bottom surface 30 faces downward.

The control unit 57 performs the discharge operation at predetermined timing. The control unit 57 may perform the discharge operation when the wiping operation is performed a predetermined number of times. The control unit 57 may perform the discharge operation when a predetermined amount of liquid is accumulated in the holding unit 29.

When the discharge operation is performed, the ejecting unit 15 moves up. That is, when the discharge operation is performed, the ejecting unit 15 is separated from the cap 23. When the ejecting unit 15 is separated from the cap 23, the control unit 57 causes the moving unit 35 to rotate the wiping section 26. In one example, the control unit 57 rotates the wiping section 26 by moving the wiping section 26 in the one direction A1 from a position facing the second recessed portion 55. Accordingly, since the bottom surface 30 faces downward, that is, the opening 33 faces downward, liquid is discharged from the holding unit 29. At this time, the liquid drops from the holding unit 29 to the receiving portion 64.

After the liquid is discharged from the holding unit 29, the control unit 57 causes the moving unit 35 to move the wiping section 26 in the direction opposite to the one direction A1. As a result, posture of the wiping section 26 returns such that the bottom surface 30 faces upward. The control unit 57 stops the wiping section 26 at the position where the wiping section 26 faces the second recessed portion 55. After the wiping section 26 stops, the ejecting unit 15 is capped by the cap 23, and thus the wiper is stored in the second recessed portion 55. Thus, the discharge operation is completed.

Actions and Effects

Next, actions and effects of the example described above will be described.

(1) The control unit 57 performs the wiping operation for causing the wiping section 26 to wipe the nozzle surface 18 by causing the moving unit 35 to move the wiping section 26, and the discharge operation for causing the bottom surface 30 to face downward by causing the moving unit 35 to move the wiping section 26.

According to the above-described configuration, when the bottom surface 30 faces downward, liquid accumulated in the holding unit 29 is discharged from the holding unit 29. Accordingly, compared to a case where liquid is discharged from the holding unit 29 by suction, a possibility of occurrence of a discharge failure is reduced.

(2) The liquid ejecting device 11 includes the receiving portion 64 that receives liquid discharged from the holding unit 29 by the discharge operation. According to the above-described configuration, a possibility that an inside of the liquid ejecting device 11 is contaminated by the liquid discharged from the holding unit 29 is reduced.

(3) The holding unit 29 is subjected to the liquid-repellent treatment. According to the configuration described above, liquid is easily discharged from the holding unit 29 in the discharge operation.

(4) The pinion 44 meshes with the rack 63 by the moving mechanism 65 moving the wiping section 26 in the one direction A1. According to the configuration described above, when the wiping section 26 moves in the one direction A1 in a state in which the pinion 44 meshes with the rack 63, the wiping section 26 rotates. That is, the wiping section 26 can be rotated by power of the moving mechanism 65. Thus, it is possible to simplify the configuration of the liquid ejecting device 11 compared to a case where the moving mechanism 65 and the rotation mechanism 43 each have separate power.

(5) The receiving portion 64 is positioned at a position different from that of the ejecting unit 15 in the one direction A1. Since the receiving portion 64 receives liquid discharged from the holding unit 29, the discharge operation is performed when the holding unit 29 is positioned directly above the receiving portion 64. Therefore, when the receiving portion 64 is positioned at a position overlapping the ejecting unit 15 in the one direction A1, the holding unit 29 is positioned between the ejecting unit 15 and the receiving portion 64 in the discharge operation. In this case, the wiping section 26 is likely to interfere with the ejecting unit 15 by rotating. In this regard, according to the above-described configuration, the holding unit 29 is less likely to interfere with the ejecting unit 15 in the discharge operation.

Modifications

The above-mentioned example may be modified as follows for implementation. The above-mentioned examples and the following modifications may be combined for implementation insofar as they are not technically inconsistent.

Figure 14:
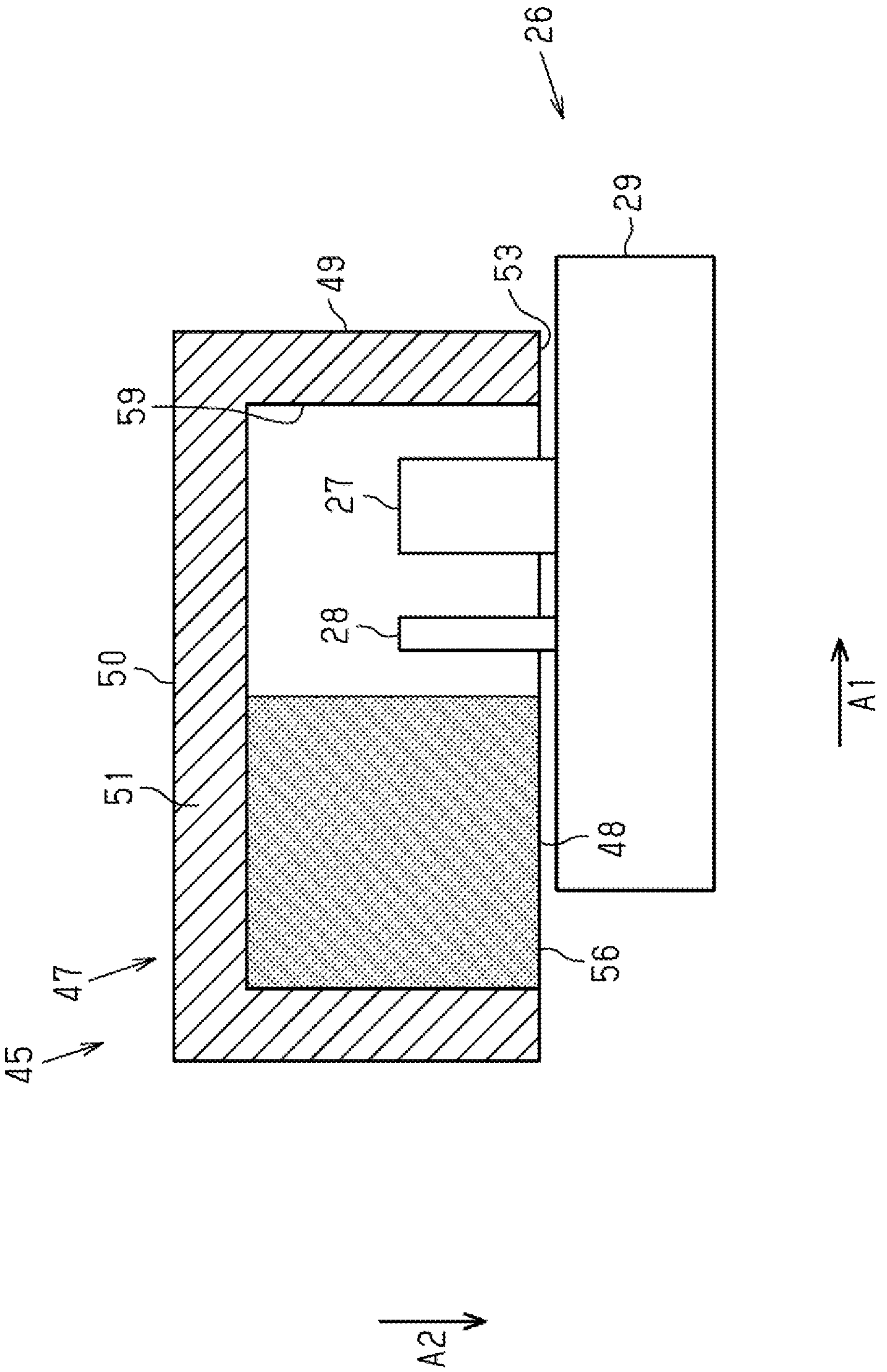
FIG. 14 is a cross-sectional view illustrating a modification of a cleaner.

As illustrated in FIG. 14, the protective member 50 may have a configuration in which one recessed portion is formed. For example, one common recessed portion 59 may be formed at the protective member 50. The absorbing material 56 may be stored in the common recessed portion 59. In the common recessed portion 59, there are a region where the absorbing material 56 is positioned and a region where the absorbing material 56 is not positioned. That is, this modification is an example in which the protective member 50 does not include the partition wall 52, as compared with the above-described example. After being cleaned by the absorbing material 56, the wiper is stored in the region of the common recessed portion 59 where the absorbing material 56 is not positioned. In this modification as well, the cleaning portion 48 and the storage portion 49 are aligned in the one direction A1.

Figure 15:
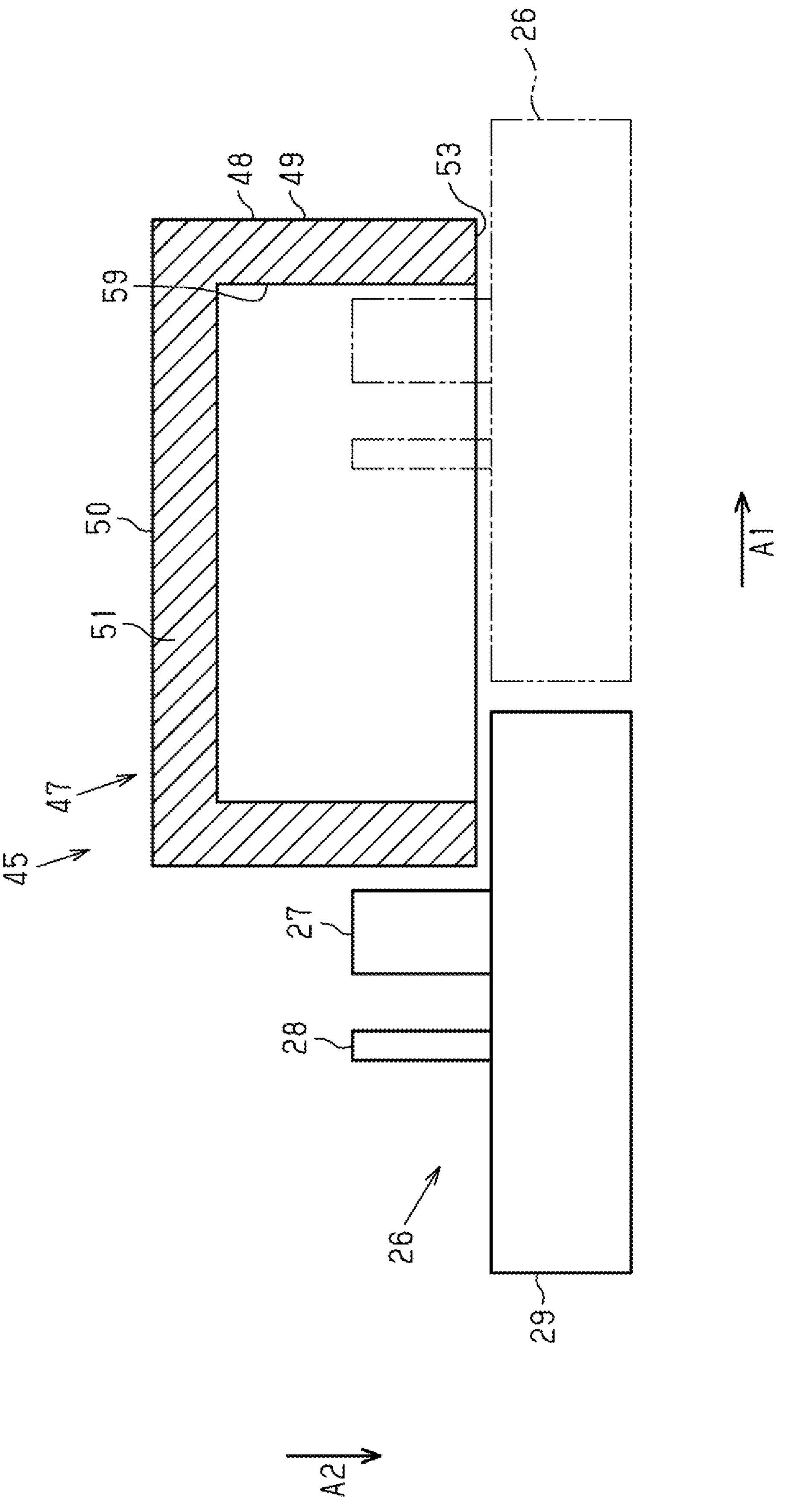
FIG. 15 is a cross-sectional view illustrating another modification of the cleaner.

As illustrated in FIG. 15, the cleaner 47 may clean the wiper by the protective member 50. For example, the wiper may be cleaned by bringing the wiper into contact with the outer wall 51. At this time, as indicated by a solid line in FIG. 15, the wiper may be cleaned by bringing the wiper into contact with an outer surface of the outer wall 51. Further, as indicated by a two-dot chain line in FIG. 15, the wiper may be cleaned by bringing the wiper into contact with an inner surface of the outer wall 51. In the latter case, after the wiper is cleaned, the wiper may be stored in the common recessed portion 59 by moving the wiping section 26 in the direction opposite to the one direction A1. The wiper may be cleaned by being brought into contact with the partition wall 52, not limited to the outer wall 51. In this modification, the cleaning portion 48 is formed of the protective member 50.

Figure 16:
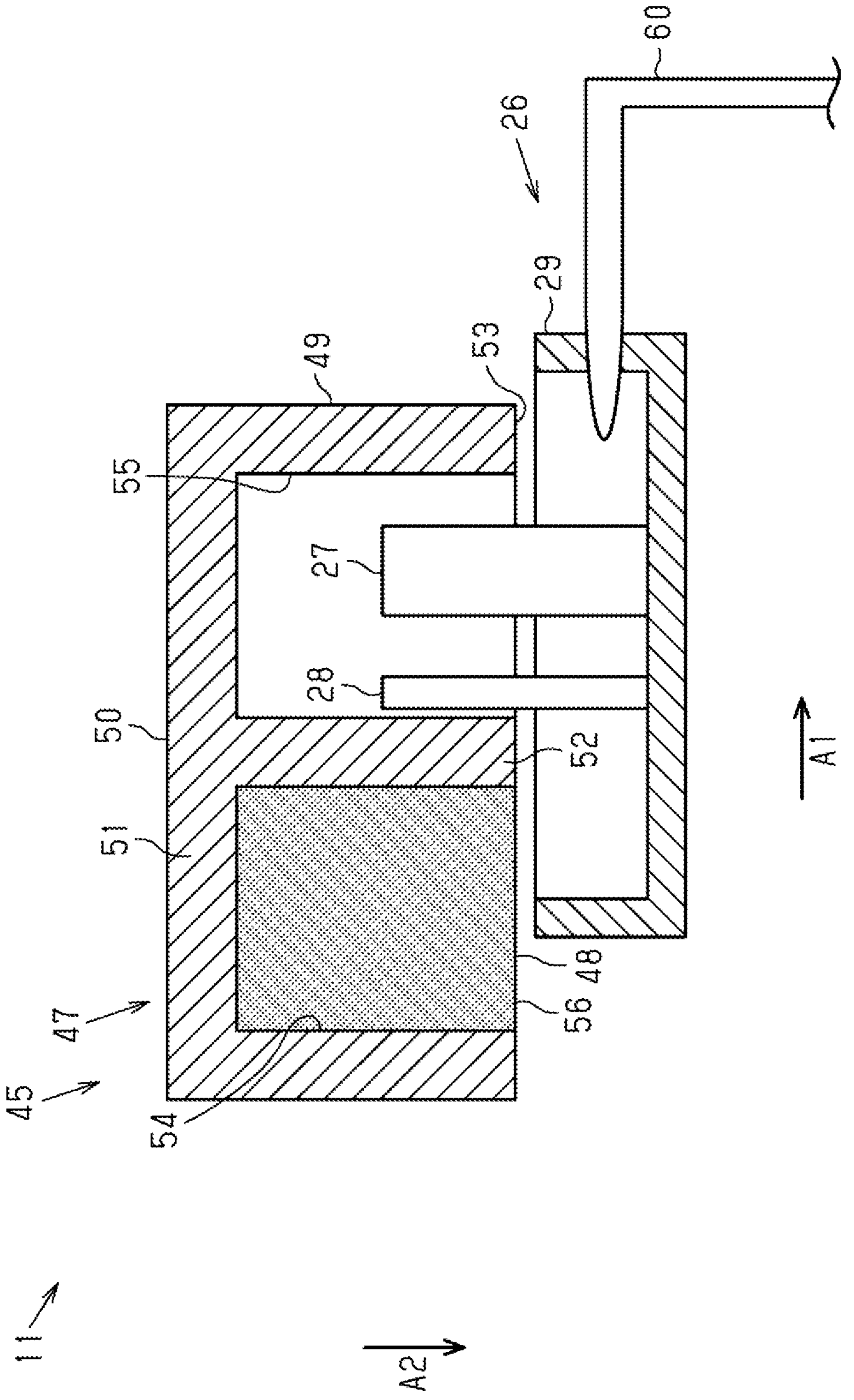
FIG. 16 is a cross-sectional view illustrating an example in which the liquid ejecting device includes a discharge unit.

As illustrated in FIG. 16, the liquid ejecting device 11 may include a discharge unit 60. The discharge unit 60 is configured to discharge liquid from the wiping section 26. Specifically, the discharge unit 60 is configured to discharge liquid accumulated in the holding unit 29. In this manner, a possibility that the liquid overflows from the holding unit 29 is reduced.

In the example illustrated in FIG. 16, the discharge unit 60 is coupled to the holding unit 29 when the wiping section 26 is positioned at a position to be stored in the cleaner 47. The discharge unit 60 discharges the liquid from the holding unit 29 by suctioning an inside of the holding unit 29 in a state of being coupled to the holding unit 29. The discharge unit

60 may be constantly coupled to the holding unit 29. For example, the discharge unit 60 may include a flexible tube that can follow movement of the wiping section 26.

Figure 17:
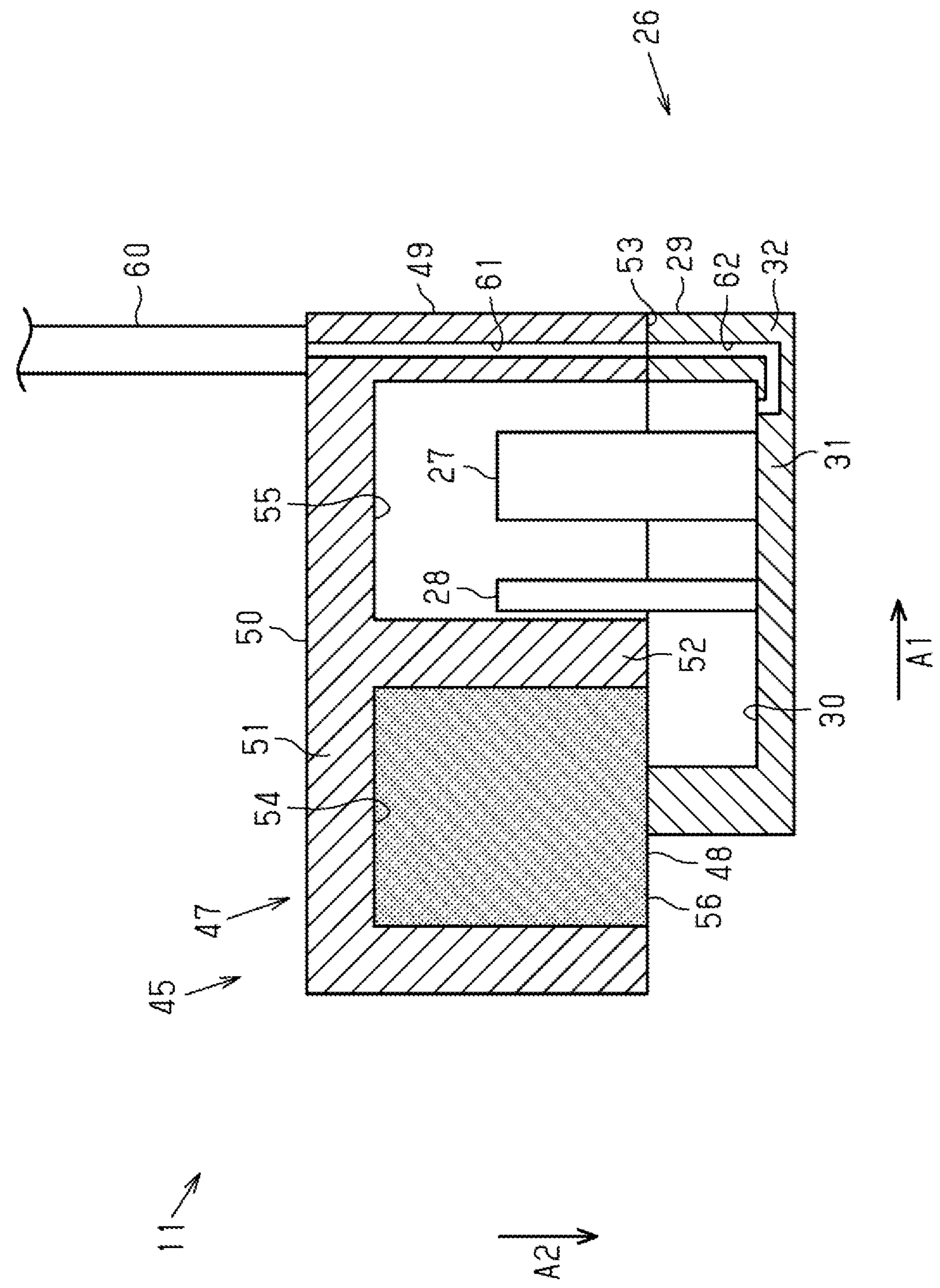
FIG. 17 is a cross-sectional view illustrating a modification of the discharge unit.

As illustrated in FIG. 17, the liquid ejecting device 11 may include the discharge unit 60. Unlike the example illustrated in FIG. 16, in the example illustrated in FIG. 17, the discharge unit 60 is coupled to the cleaner 47. Specifically, the discharge unit 60 is coupled to the protective member 50. A first flow path 61 opens at the protective member 50. The first flow path 61 extends so as to penetrate the protective member 50. In one example, the first flow path 61 extends inside the outer wall 51. The discharge unit 60 communicates with the first flow path 61. The first flow path 61 may extend inside the partition wall 52. A second flow path 62 opens at the holding unit 29. The second flow path 62 extends inside the bottom wall 31 and the side wall 32. When the wiping section 26 is positioned at a position to be stored in the cleaner 47, the second flow path 62 communicates with the first flow path 61. Specifically, the second flow path 62 communicates with the first flow path 61 by the holding unit 29 coming into close contact with the protective member 50. In this state, the discharge unit 60 performs suction. In this manner, the discharge unit 60 suctions liquid from the wiping section 26 through the first flow path 61 and the second flow path 62. As a result, the liquid is discharged from the holding unit 29.

Figure 18:
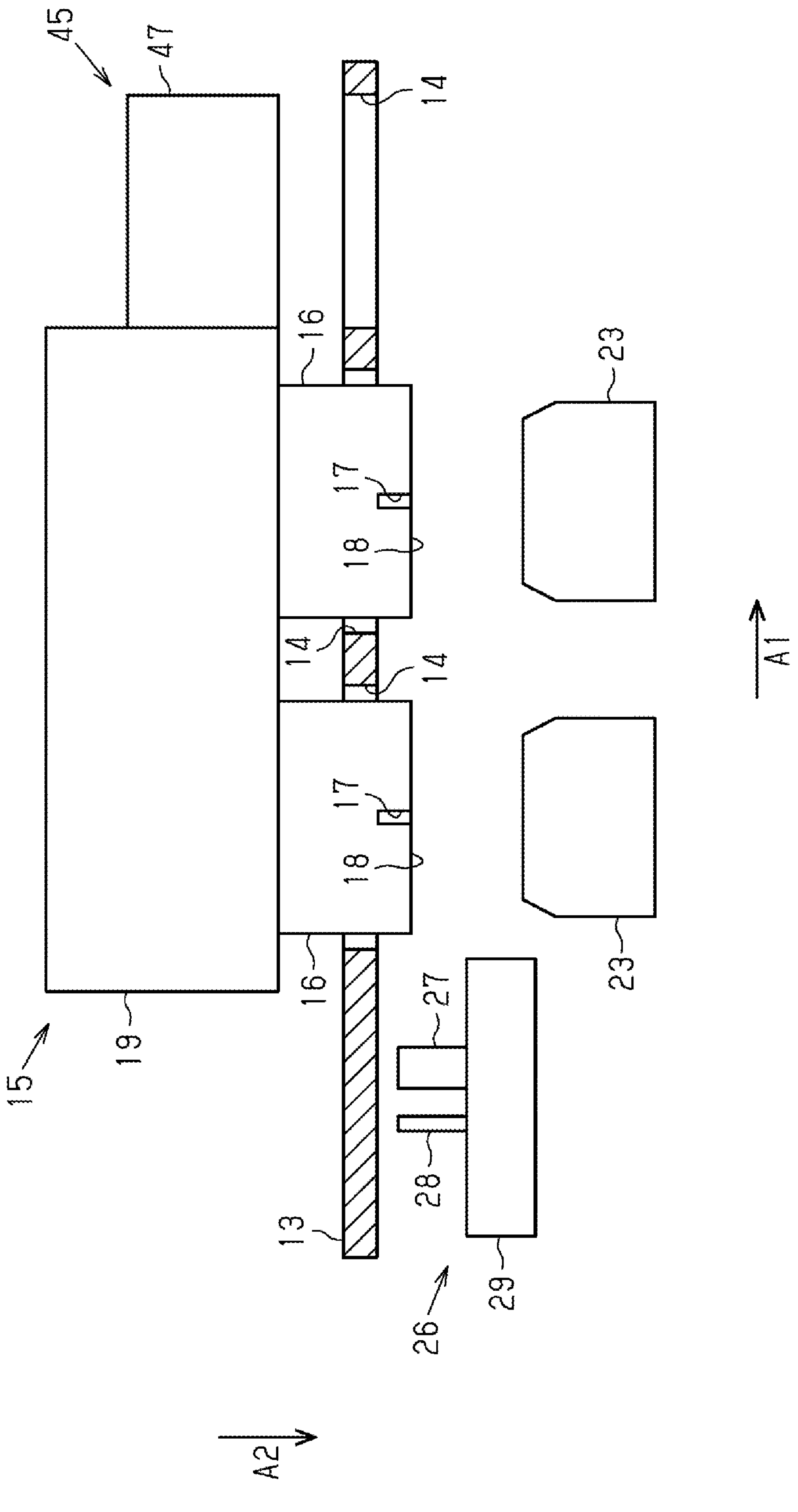
FIG. 18 is a cross-sectional view illustrating a modification of a support portion.

As illustrated in FIG. 18, a plurality of the openings 14 may be formed at the support portion 13. The plurality of openings 14 are formed so as to correspond to the plurality of caps 23. That is, the plurality of openings 14 are formed so as to correspond to the plurality of heads 16. Accordingly, compared to a case where one opening 14 exposes the plurality of heads 16, a support area of the medium 99 in the support unit 13 is increased. The opening 14 corresponding to the cleaner 47 may be formed at the support portion 13 in addition to the opening 14 corresponding to the head 16.

The plurality of caps 23 cap the plurality of heads 16 through the plurality of openings 14, respectively. That is, the head 16 is capped by the cap 23, the head 16, or both passing through the opening 14. For example, the cap 23 may come into contact with the head 16 by the cap 23 passing through the opening 14, or the cap 23 may come into contact with the head 16 by the head 16 passing through the opening 14. Further, the cap 23 may come into contact with the head 16 inside the opening 14. According to this modification example, similarly to the above-described example, the ejecting unit 15 can be capped without moving the support unit 13.

Figure 21:
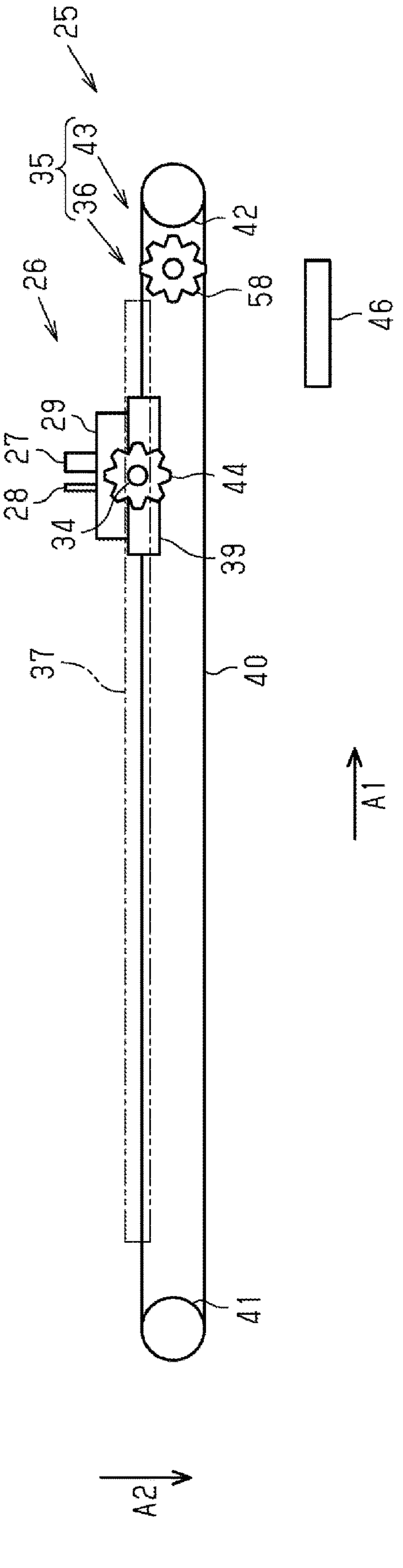
FIG. 21 is a front view illustrating a modification of the moving unit.

As illustrated in FIG. 21, the rotation mechanism 43 is not limited to including the pinion 44 and the rack 63, and may include the pinion 44 and a gear 58. The pinion 44 meshes with the gear 58 by the wiping section 26 moving in the one direction A1. The gear 58 rotates in a state of meshing with the pinion 44. Accordingly, the wiping section 26 rotates. In this modification, different from the above-described example, the moving mechanism 65 and the rotation mechanism 43 each require separate power.

Figure 22:
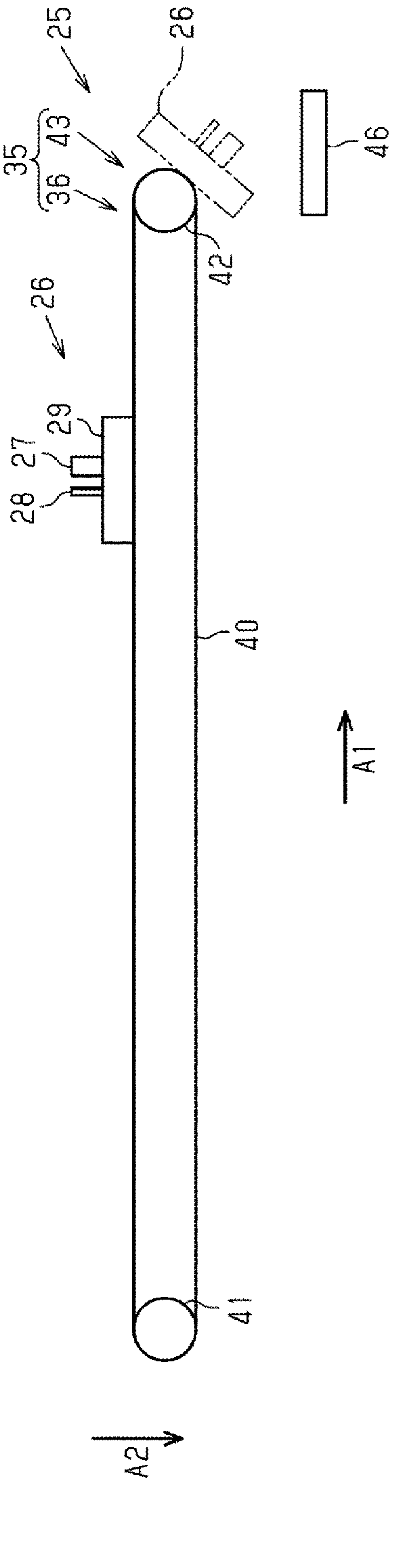
FIG. 22 is a front view illustrating another modification of the moving unit.

As illustrated in FIG. 22, the wiping section 26 may be positioned at the timing belt 40. Specifically, the wiping section 26 may be installed at the timing belt 40. The wiping section 26 may be rotated by being moved by rotation of the timing belt 40. In this case, by the timing belt 40 rotating, posture of the wiping section 26 changes at the second roller 42. Accordingly, the wiping section 26 is rotated such that the bottom surface 30 faces downward. In this manner, the timing belt 40 moves the wiping section 26 in the one direction A1 or rotates the wiping section 26. In this modification, the moving mechanism 65 and the rotation mechanism 43 are commonly configured.

Figure 23:
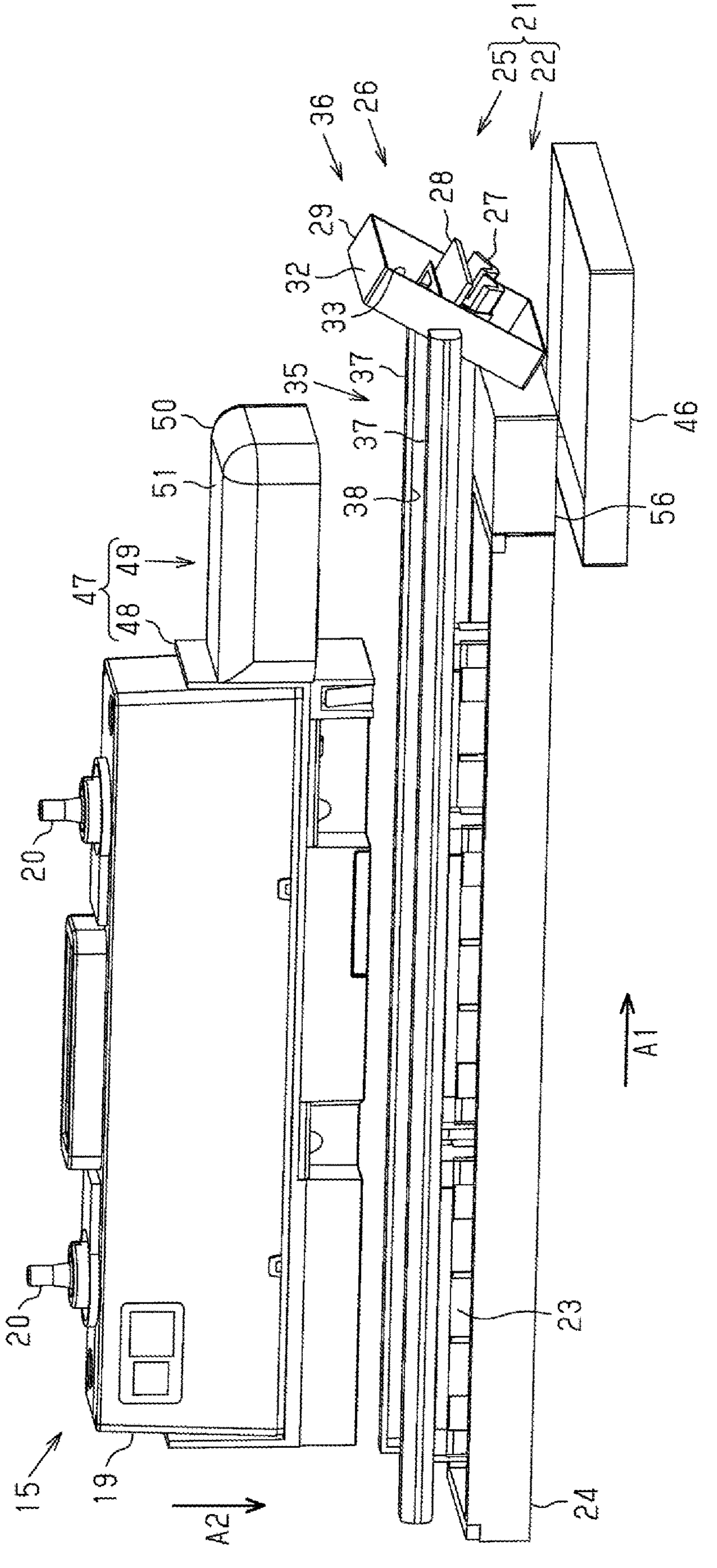
FIG. 23 is a perspective view illustrating a modification of the cleaner.
Figure 24:
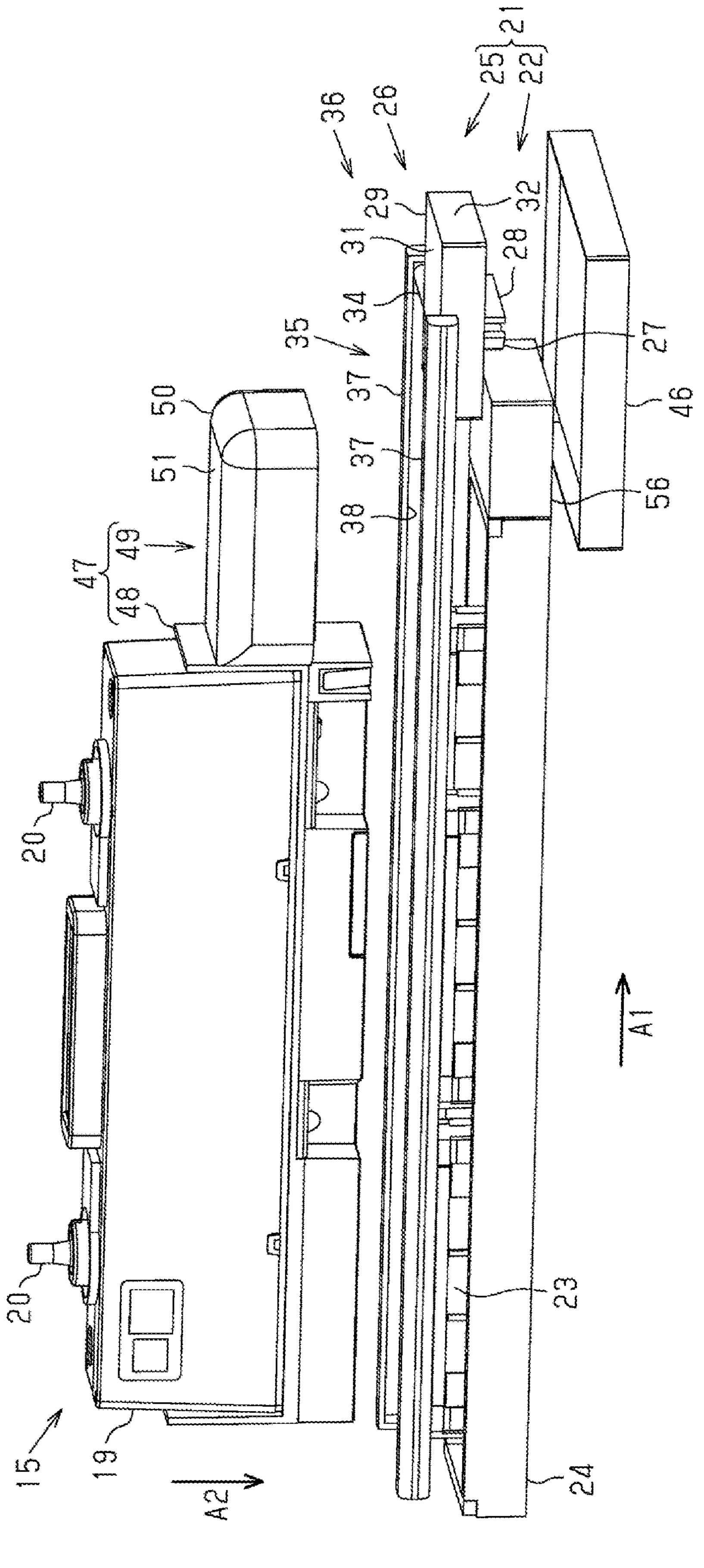
FIG. 24 is a perspective view when liquid is ejected in the modification illustrated in FIG. 23.
Figure 25:
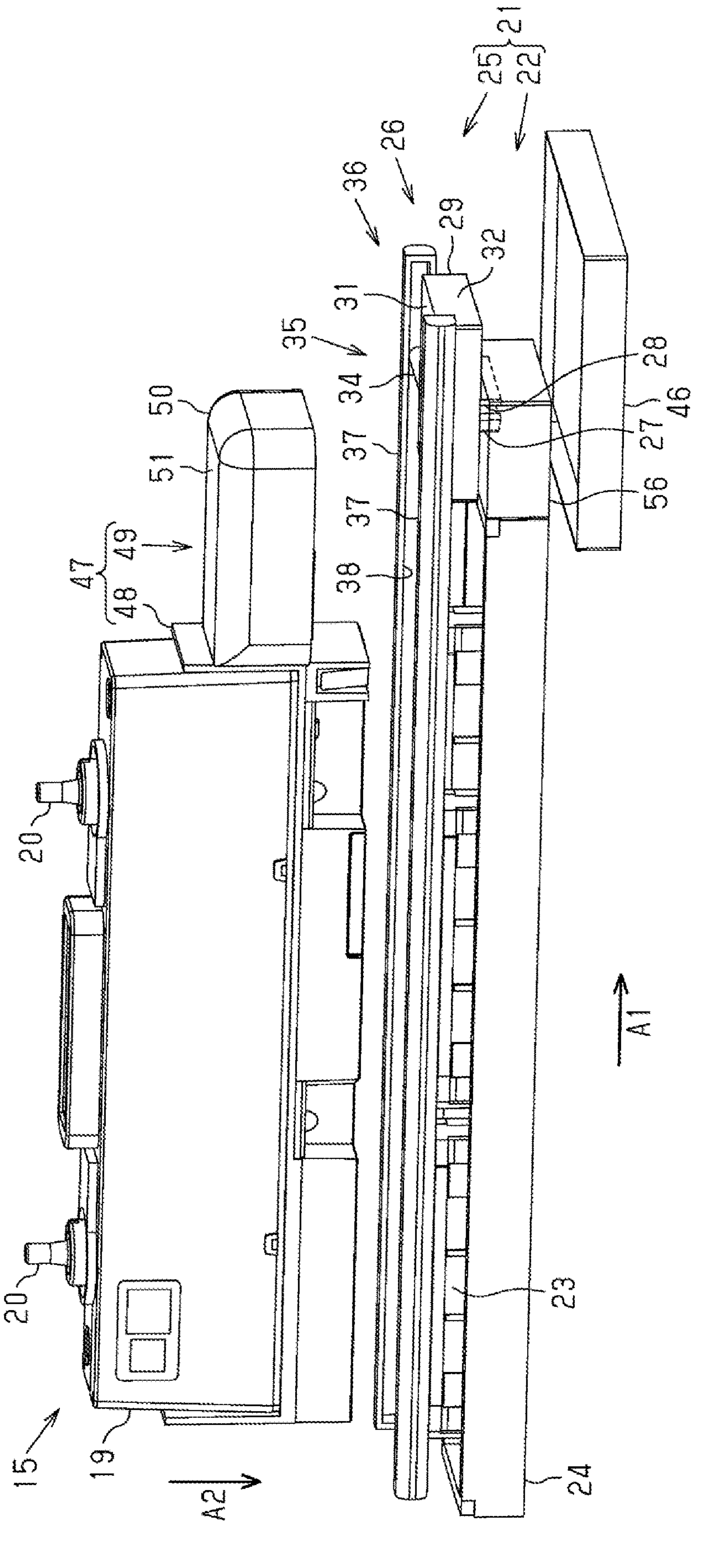
FIG. 25 is a perspective view when the wiper is cleaned in the modification illustrated in FIG. 23.

As illustrated in FIGS. 23, 24, and 25, the absorbing material 56 may be attached to the cap unit 22. Specifically, the absorbing material 56 is attached to the base member 24. The absorbing material 56 is positioned, for example, at a position shifted from the base member 24 in the one direction A1. In this modification, the control unit 57 can perform the cleaning operation during the discharge operation. The control unit 57 moves the wiping section 26 in the direction opposite to the one direction A1 in a state in which the bottom surface 30 faces downward by rotating the wiping section 26. Thus, the control unit 57 brings the tip of the wiper into contact with the absorbing material 56. In this modification, the absorbing material 56 may be or need not be stored in the first recessed portion 54. That is, the wiper may be cleaned by the two absorbing materials 56, or may be cleaned by only the absorbing material 56 attached to the cap unit 22.

The liquid ejected by the ejecting unit 15 is not limited to ink, and may be, for example, a liquid material including particles of a functional material dispersed or mixed in liquid. For example, the ejecting unit 15 may eject a liquid material including, in a dispersed or dissolved form, a material such as an electrode material or a pixel material used in manufacture of a liquid crystal display, an electroluminescent (EL) display, and a surface emitting display.

Technical Ideas

The technical ideas and effects obtained from the above-described embodiments and modifications will be described below.

(A) A liquid ejecting device includes an ejecting unit including a nozzle surface at which a nozzle for ejecting liquid opens, a cap unit configured to perform capping to form a space communicating with the nozzle by coming into contact with the ejecting unit, a wiper unit configured to perform wiping to wipe the nozzle surface, and a cleaning unit attached to the ejecting unit, and configured to perform cleaning on the wiper unit, wherein the wiper unit includes a wiping section that moves in one direction, the wiping section includes a wiper that comes into contact with the nozzle surface, the cleaning unit includes a cleaner that performs the cleaning on the wiper, the cap unit comes into contact with the ejecting unit by the ejecting unit approaching the cap unit in a perpendicular direction of the nozzle surface, a position of the cleaner in the perpendicular direction overlaps a position of the wiper in the perpendicular direction during the capping, and does not overlap the position of the wiper in the perpendicular direction during the wiping.

During the capping, the wiper overlaps the cleaner when viewed from the one direction, whereas during the wiping, the wiper does not overlap the cleaner when viewed from the one direction. That is, the cleaner is positioned at a position recessed from the nozzle surface with respect to the wiper. Therefore, in a state in which the wiper is in contact with the cleaner, the cap unit can cap the ejecting unit. Therefore, according to the above-described configuration, it is not necessary to retract the wiper from the cleaner during the capping. Accordingly, an increase in a size of the liquid ejecting device is suppressed.

(B) In the above liquid ejecting device, the cleaner may include a cleaning portion that performs the cleaning by coming into contact with the wiper, and a storage portion that stores the wiper, and the cleaning portion and the storage portion may be aligned in the one direction. According to the above configuration, the wiper is smoothly stored by the storage portion after being cleaned by the cleaning portion by moving in the one direction.

(C) The above liquid ejecting device may include a control unit configured to control the wiper, wherein the control unit may cause the wiper to be stored in the storage portion, by moving the wiper in the one direction in a state in which the wiper is in contact with the cleaning portion during the capping. According to the above configuration, in a state in which the ejecting unit is capped, the wiper is cleaned by the cleaning portion and then stored by the storage portion. Therefore, a movement amount of the ejecting unit is reduced compared to a configuration in which the ejecting unit moves after cleaning of the wiper in order to store the wiper.

(D) In the liquid ejecting device, the cleaner may be positioned at a position that does not overlap the ejecting unit when viewed from the perpendicular direction. According to the configuration described above, the wiper is less likely to interfere with the ejecting unit during the capping.

(E) In the above liquid ejecting device, the ejecting unit may be a line head including a plurality of heads aligned in the one direction, and the cap unit may include a plurality of caps that perform the capping on the plurality of the heads, respectively. According to the above-described configuration, capping accuracy is improved compared to a case where one cap caps the plurality of heads.

(F) The above liquid ejecting device may include a support portion configured to support a medium on which liquid is ejected from the ejecting unit, wherein a plurality of openings respectively corresponding to the plurality of caps may be formed at the support portion, and the capping may be performed by at least any of the plurality of caps and the plurality of heads passing through the plurality of openings. According to the above configuration, it is possible to cap the ejecting unit without moving the support portion.

What is claimed is:

1. A liquid ejecting device, comprising:

an ejecting unit including a nozzle surface at which a nozzle for ejecting liquid opens;

a cap unit configured to perform capping to form a space communicating with the nozzle by coming into contact with the ejecting unit;

a wiper unit configured to perform wiping to wipe the nozzle surface; and a cleaning unit attached to the ejecting unit, and configured to perform cleaning on the wiper unit, wherein the wiper unit includes a wiping section that moves in one direction, the wiping section includes a wiper that comes into contact with the nozzle surface, the cleaning unit includes a cleaner that performs the cleaning on the wiper, the cleaner includes:

a cleaning portion that performs the cleaning by coming into contact with the wiper; and a storage portion that stores the wiper, the cleaning portion and the storage portion are aligned in the one direction, the cap unit comes into contact with the ejecting unit by the ejecting unit approaching the cap unit in a perpendicular direction of the nozzle surface, a position of the cleaner in the perpendicular direction overlaps a position of the wiper in the perpendicular direction during the capping, and the position of the cleaner in the perpendicular direction does not overlap the position of the wiper in the perpendicular direction during the wiping.

2. The liquid ejecting device according to claim 1, further comprising a control unit configured to control the wiper, wherein the control unit causes the wiper to move in the one direction in a state in which the wiper is in contact with the cleaning portion, during the capping, to store the wiper in the storage portion.

3. The liquid ejecting device according to claim 1, wherein the cleaner is positioned at a position that does not overlap the ejecting unit when viewed from the perpendicular direction.

4. The liquid ejecting device according to claim 1, wherein the ejecting unit is a line head including a plurality of heads aligned in the one direction, and the cap unit includes a plurality of caps that perform the capping on the plurality of the heads, respectively.

5. The liquid ejecting device according to claim 4, further comprising a support portion configured to support a medium on which the liquid is ejected from the ejecting unit, wherein a plurality of openings respectively corresponding to the plurality of caps are formed at the support portion, and the capping is performed by at least any of the plurality of caps and the plurality of heads passing through the plurality of openings.

6. A liquid ejecting device, comprising:

an ejecting unit including a nozzle surface at which a nozzle for ejecting liquid opens;

a cap unit configured to perform capping to form a space communicating with the nozzle by coming into contact with the ejecting unit;

a wiper unit configured to perform wiping to wipe the nozzle surface; and a cleaning unit attached to the ejecting unit, and configured to perform cleaning on the wiper unit, wherein the wiper unit includes a wiping section that moves in one direction, the wiping section includes a wiper that comes into contact with the nozzle surface, the cleaning unit includes a cleaner that performs the cleaning on the wiper, a distance between the cleaner and the wiping section in a perpendicular direction of the nozzle surface is greater than a distance between the ejecting unit and the wiping section in the perpendicular direction, the cap unit comes into contact with the ejecting unit by the ejecting unit approaching the cap unit in the perpendicular direction of the nozzle surface, a position of the cleaner in the perpendicular direction overlaps a position of the wiper in the perpendicular direction during the capping, and the position of the cleaner in the perpendicular direction does not overlap the position of the wiper in the perpendicular direction during the wiping.

7. The liquid ejecting device according to claim 6, wherein the cleaner is positioned at a position that does not overlap the ejecting unit when viewed from the perpendicular direction.

8. The liquid ejecting device according to claim 6, wherein the ejecting unit is a line head including a plurality of heads aligned in the one direction, and the cap unit includes a plurality of caps that perform the capping on the plurality of the heads, respectively.

9. The liquid ejecting device according to claim 8, further comprising a support portion configured to support a medium on which the liquid is ejected from the ejecting unit, wherein a plurality of openings respectively corresponding to the plurality of caps are formed at the support portion, and the capping is performed by at least any of the plurality of caps and the plurality of heads passing through the plurality of openings.

* * * * *